United States Patent
Wei et al.

(10) Patent No.: US 10,877,881 B2
(45) Date of Patent: Dec. 29, 2020

(54) IN-PLACE GARBAGE COLLECTION OF A SHARDED, REPLICATED DISTRIBUTED STATE MACHINE BASED ON MERGEABLE OPERATIONS

(71) Applicant: VMware, Inc., Palo Alto, CA (US)

(72) Inventors: Michael Wei, Palo Alto, CA (US); Maithem Munshed, Palo Alto, CA (US); Anny Martinez Manzanilla, Santa Clara, CA (US); Zeeshan Altaf Lokhandwala, Santa Clara, CA (US); Saeed A Behnam, Palo Alto, CA (US); Medhavi Dhawan, Cupertino, CA (US); Dahlia Malkhi, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 162 days.

(21) Appl. No.: 16/246,416

(22) Filed: Jan. 11, 2019

(65) Prior Publication Data
US 2020/0226060 A1    Jul. 16, 2020

(51) Int. Cl.
*G06F 12/02* (2006.01)
*G06F 3/06* (2006.01)

(52) U.S. Cl.
CPC ........ *G06F 12/0253* (2013.01); *G06F 3/0608* (2013.01); *G06F 3/0652* (2013.01); *G06F 3/0683* (2013.01)

(58) Field of Classification Search
CPC .. G06F 12/0253; G06F 3/0683; G06F 3/0652; G06F 3/0608; G06F 3/0671
USPC .......................................................... 707/813
See application file for complete search history.

(56) References Cited

U.S. PATENT DOCUMENTS

| | | | |
|---|---|---|---|
| 5,546,536 A * | 8/1996 | Davis .................. | G06F 11/2064 711/161 |
| 6,526,417 B1 * | 2/2003 | Perry .................. | G06F 16/2358 |
| 6,732,124 B1 * | 5/2004 | Koseki ................ | G06F 11/1435 |
| 7,567,973 B1 * | 7/2009 | Burrows .............. | G06F 16/22 |
| 9,460,008 B1 * | 10/2016 | Leshinsky ........... | G06F 12/0238 |
| 9,501,501 B2 * | 11/2016 | Madhavarapu ..... | G06F 16/2358 |
| 9,613,120 B1 * | 4/2017 | Kharatishvili ......... | G06F 16/23 |
| 9,720,619 B1 * | 8/2017 | Shah .................... | H04L 67/1097 |
| 9,785,510 B1 * | 10/2017 | Madhavarapu ......... | G06F 3/065 |
| 9,817,587 B1 * | 11/2017 | Leshinsky ............. | G06F 3/064 |
| 9,870,386 B1 * | 1/2018 | Madhavarapu ..... | G06F 16/2379 |
| 10,360,195 B1 * | 7/2019 | McKelvie ........... | G06F 16/2282 |
| 10,567,500 B1 * | 2/2020 | Leshinsky ........... | H04L 67/1097 |
| 10,657,099 B1 * | 5/2020 | Vona .................... | G06F 16/168 |

(Continued)

OTHER PUBLICATIONS

Balakrishnan et al., "CORFU: A Shared Log Design for Flash Clusters", 9th USENIX Symposium on Networked Systems Design and Implementation (NSDI '12), Apr. 2012, 14 pages (Year: 2012).*

(Continued)

*Primary Examiner* — Phuong Thao Cao

(57) ABSTRACT

A log unit provides a shared log for recording updates on data objects. Garbage collection is performed locally and in-place by the log unit. In a marking portion of the garbage collection process, the log unit identifies and marks log entries that record mergeable updates. In a deallocation portion of the process, the log unit merges one or more mergeable log entries and deallocates at least portions of the merged log entries.

20 Claims, 13 Drawing Sheets

(56) References Cited

U.S. PATENT DOCUMENTS

| | | | |
|---|---|---|---|
| 2005/0273654 A1* | 12/2005 | Chen | G06F 11/2082 714/13 |
| 2006/0233010 A1* | 10/2006 | Li | G06F 12/0893 365/22 |
| 2006/0239080 A1* | 10/2006 | Li | G11C 7/22 365/185.22 |
| 2007/0255909 A1 | 1/2007 | Gschwind et al. | |
| 2008/0222209 A1 | 9/2008 | Nakano et al. | |
| 2012/0203584 A1 | 8/2012 | Mishor et al. | |
| 2012/0290541 A1* | 11/2012 | Anderson | G06F 11/106 707/685 |
| 2014/0173177 A1* | 6/2014 | Benhase | G06F 12/0246 711/103 |
| 2014/0279920 A1* | 9/2014 | Madhavarapu | G06F 11/1458 707/649 |
| 2014/0310499 A1 | 10/2014 | Sundararaman et al. | |
| 2016/0188622 A1 | 6/2016 | Sharangpani | |
| 2017/0024315 A1* | 1/2017 | Leshinsky | G06F 12/0253 |
| 2017/0097873 A1* | 4/2017 | Krishnamachari | G06F 3/0688 |
| 2017/0132271 A1* | 5/2017 | Jiao | G06F 11/14 |
| 2017/0250816 A1* | 8/2017 | Popa | G06F 21/12 |
| 2017/0262489 A1* | 9/2017 | Seo | G06F 16/2365 |
| 2017/0357577 A1 | 12/2017 | Lee et al. | |
| 2017/0364273 A1* | 12/2017 | Schreter | G06F 3/0619 |
| 2019/0163490 A1* | 5/2019 | Silberman | G06F 9/3867 |
| 2020/0012729 A1* | 1/2020 | Shaikh | G06F 12/0253 |
| 2020/0068038 A1* | 2/2020 | Xing | H04L 67/1095 |
| 2020/0201721 A1 | 6/2020 | Wei et al. | |

OTHER PUBLICATIONS

Non-Final Office Action related to U.S. Appl. No. 16/226,612 filed Dec. 19, 2018, dated Oct. 6, 2020, 14 pages.

* cited by examiner

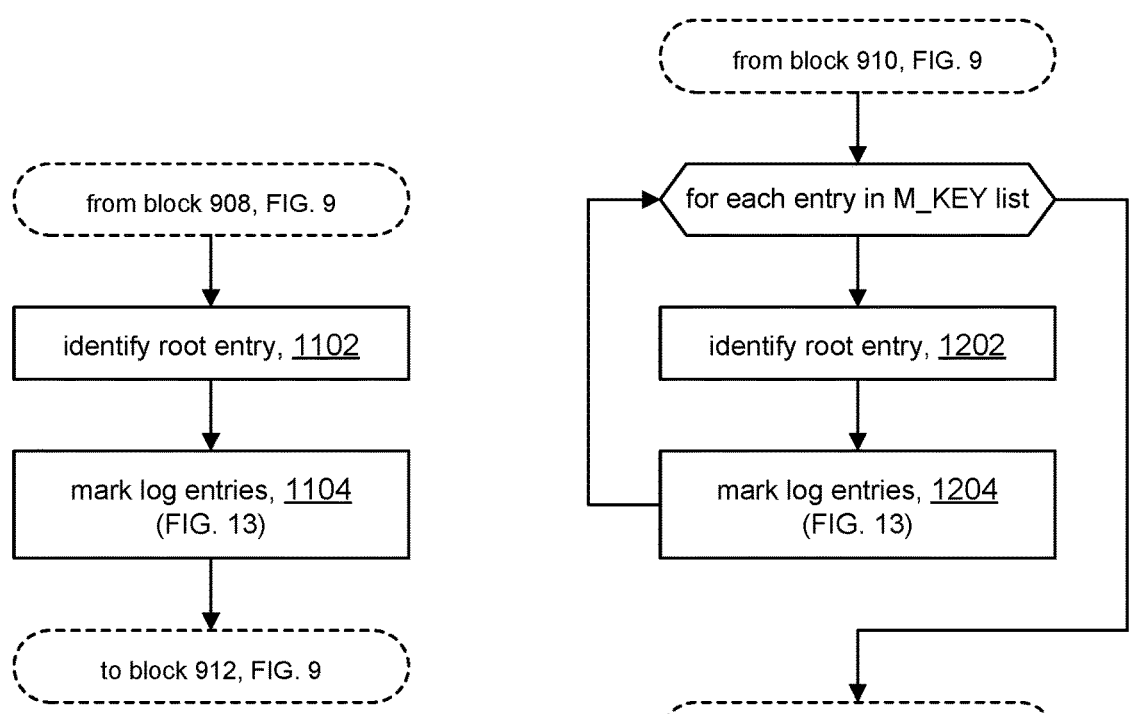
FIG. 11
FIG. 12
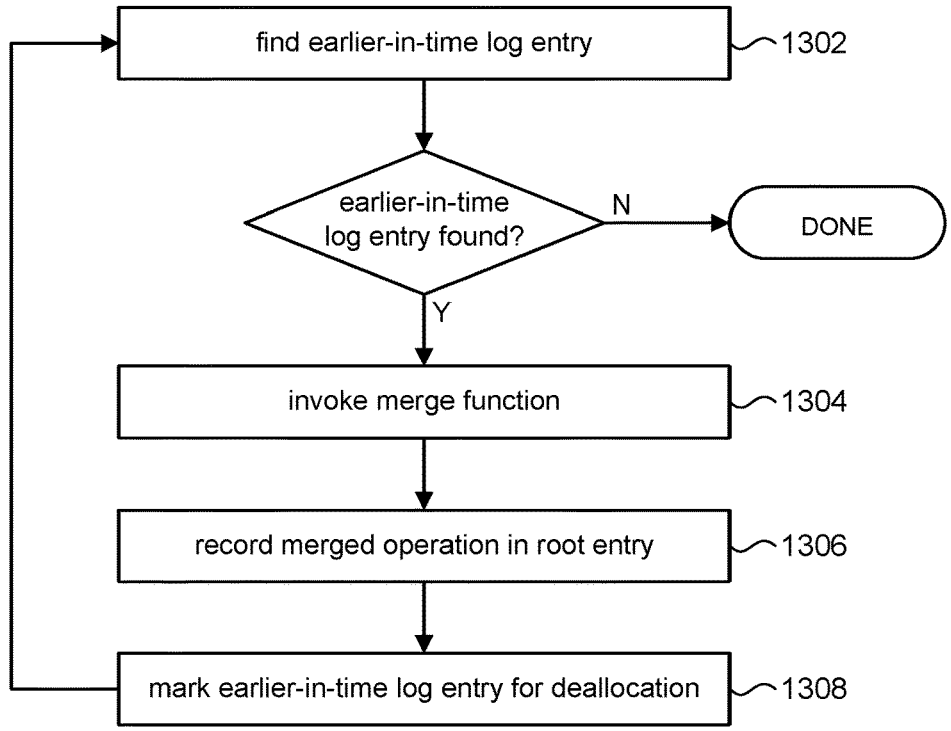
FIG. 13

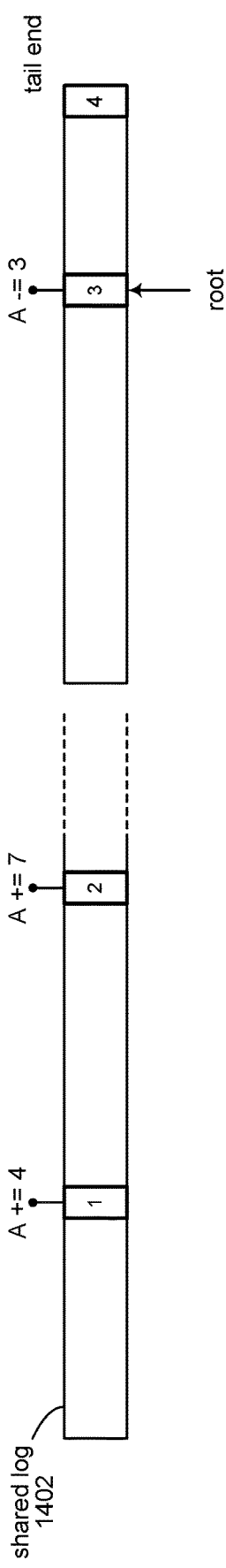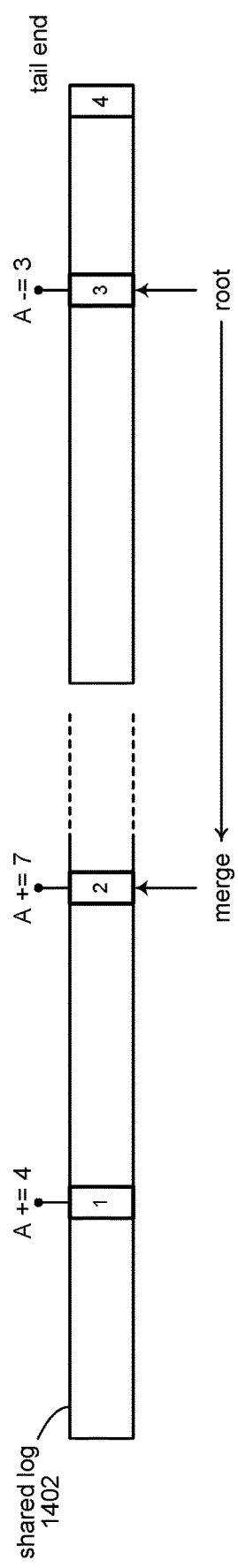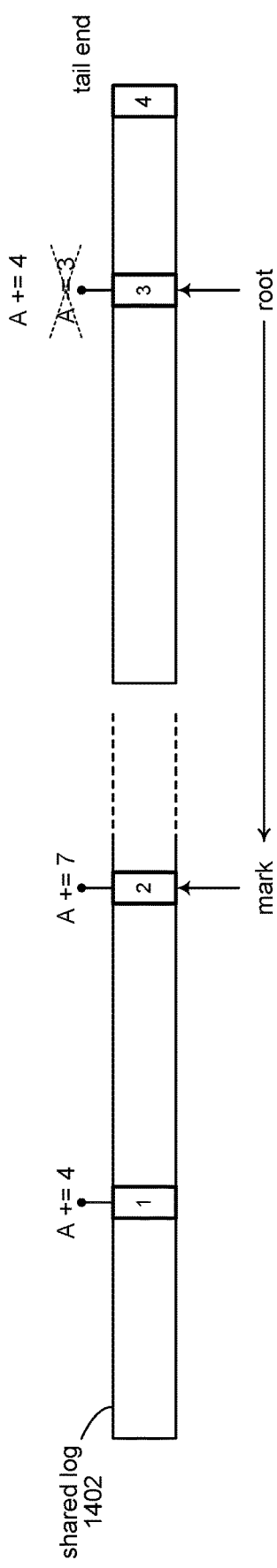

IN-PLACE GARBAGE COLLECTION OF A SHARDED, REPLICATED DISTRIBUTED STATE MACHINE BASED ON MERGEABLE OPERATIONS

CROSS REFERENCE TO RELATED APPLICATIONS

This application is related to U.S. application Ser. No. 16/226,612 entitled "In-place Garbage Collection of a Sharded, Replicated Distributed State Machine Based on Supersedabe Operations", filed Dec. 19, 2018, the content of which is incorporated herein by reference in its entirety for all purposes.

BACKGROUND

A distributed object store can be based on a shared log. Clients interact with distributed objects, and changes to these objects are recorded as entries in a log using the state machine replication (SMR) paradigm. The log can be transactional: multiple objects can be modified atomically by grouping their changes into a single log entry. To maximize scalability, log entries can be distributed across a cluster in the order they are accepted into the log: for instance, a simple cluster using two servers may direct even entries to one server and odd entries to another.

Garbage collection refers to the reclaiming of memory previously allocated by a program to data objects that are no longer in use by that program. Garbage collection is an important consideration in building scalable, production-grade distributed storage systems. Because garbage collectors are only required when a system is resource constrained and do not necessarily affect the normal functions of a system, they are often overlooked or considered as an afterthought. However, a poorly designed garbage collector can grind an entire system to a halt, a problem which may only occur sporadically in a deployed production system.

A process called checkpointing is a garbage collection technique for state machine replicated systems. Checkpointing involves producing a consistent snapshot of the system, known as a checkpoint, serializing that data and then writing it to the log. The log entries which were summarized in the checkpoint operation can then be reclaimed, a process known as trimming the log.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 10, 11, 12, and 13 show simplified flows of operations for in-place garbage collection of a shared log in accordance with another aspect of the present disclosure.

FIGS. 14A-14E illustrate an example for garbage collection of a shared log in accordance with another aspect of the present disclosure.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below and may further include modifications and equivalents of the features and concepts described herein.

Figure 1:
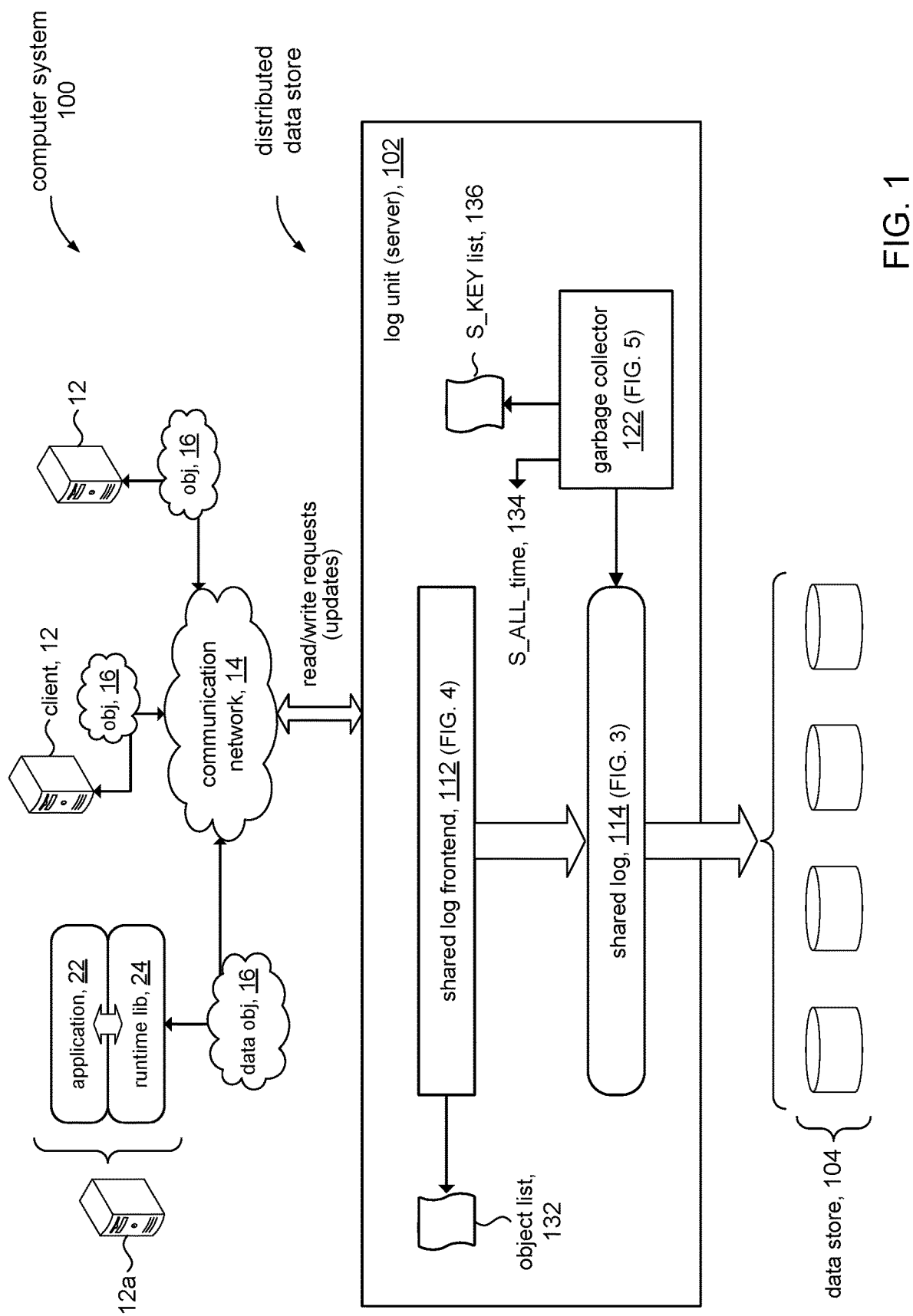
FIG. 1 shows system configured with a shared log in accordance with some embodiments of the present disclosure.

FIG. 1 shows a computer system 100 that includes a distributed object store based on a shared log in accordance with some embodiments of the present disclosure. The computer system 100 can include client computers (clients) 12 that access a log unit (log server) 102 over a communication network 14. Clients 12 can interact with the distributed data objects 16, including reading data objects and writing to data objects. Generally, a client (e.g., client 12*a*) executing an application 22 can access data objects using a runtime library 24 to read and write data objects on a shared log 114. In a particular instance, for example, the runtime 24 can enable clients 12 to load data objects 16 by name (e.g., a string) and type (e.g., a Java class). Once a data object 16 is loaded, clients 12 can read and write the data object 16 by calling methods on the data object. The runtime 24 intercepts these method calls and interacts with the shared log 114 to persist changes and update the data object's state. Developer-provided annotations on the Java class helps the runtime 24 determine whether a method will merely access (read) a data object 16 or modify (write) a data object's state. A method which modifies state generates a state machine operation, which records a description of the method and the parameters it was called with into the shared log 114.

In some embodiments, for example, the clients 12 can be application servers in a data center, but are referred to as "clients" from the point of view of log unit 102. The application 22 can be any suitable data consumer such as database applications, transactional key-value stores, replicated state machines, metadata services, virtual disks, and the like.

The log unit 102 can record changes (write operations) made to the data objects 16 as addressable log entries (302, FIG. 3) in the shared log 114. The log unit 102 can act as a persistent storage layer using a suitable persistent data store 104 to store the log entries. In some embodiments, the data store 104 can be configured as a storage server or as network-attached storage, and so on. The data store 104 can comprise distributed storage devices such as hard disk drives, flash-based storage, and the like.

The log unit 102 can include a shared log frontend 112 to receive and process read requests and write requests (updates) from clients 12. In accordance with the present disclosure, the shared log frontend 112 can maintain an objects list 132 of data objects 16 that are specified or otherwise identified in write requests received from clients 12 in order to identify data objects 16 during the garbage collection process. This aspect of the present disclosure is further discussed below.

In accordance with the present disclosure, the log unit 102 can be configured with a garbage collector 122 to perform its own (local) garbage collection operations to reclaim storage from the log unit 102. In some embodiments, the garbage collector 122 can use data structures S_ALL-time 134 and S_KEY list 136 to facilitate the garbage collection process. These aspects of the present disclosure are further discussed below.

Figure 2:
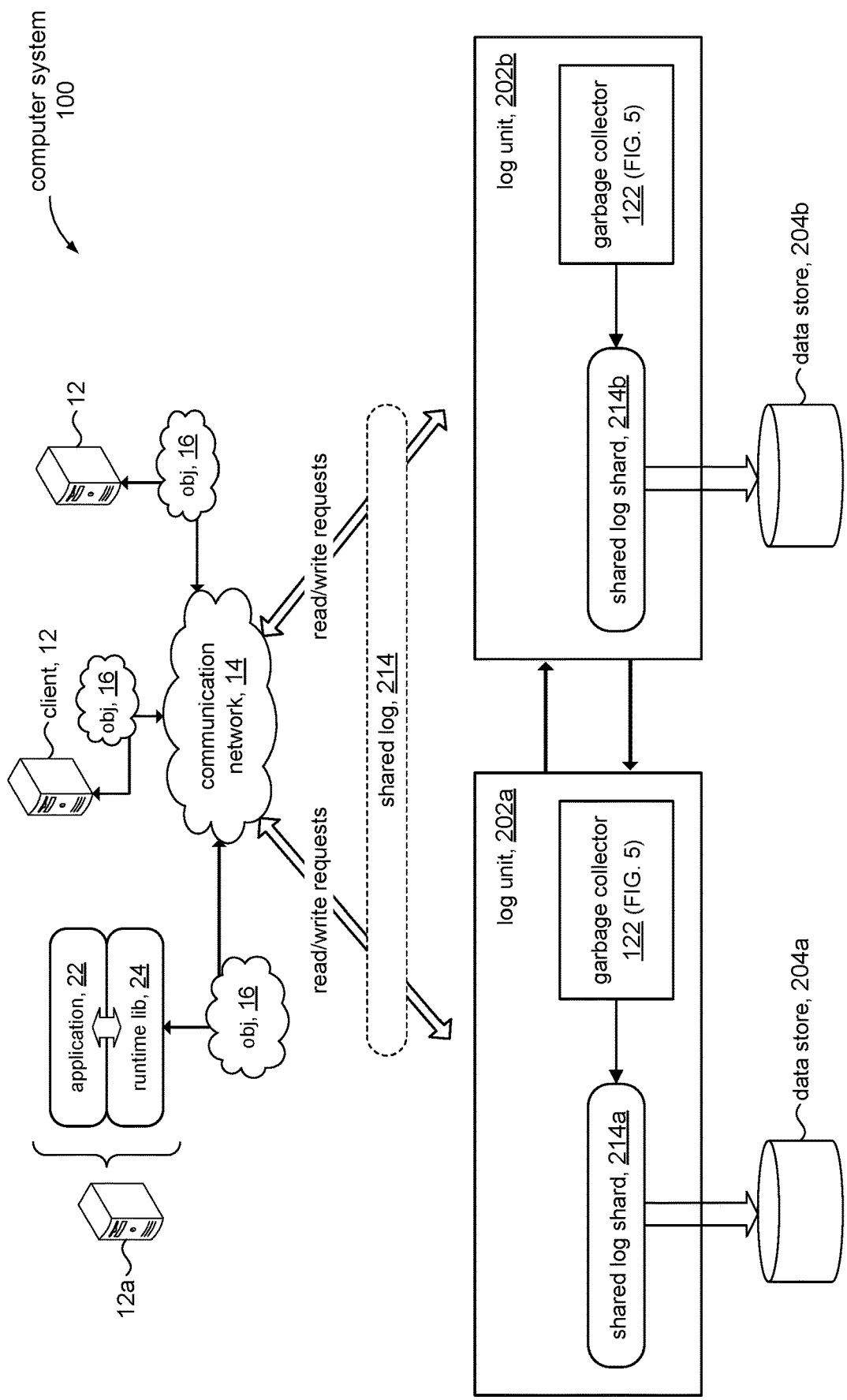
FIG. 2 shows system configured with a distributed (sharded) shared log in accordance with some embodiments of the present disclosure.

Referring to FIG. 2, in some embodiments, the log entries comprising a shared log can be distributed across a cluster of log units to improve scalability. FIG. 2 shows a cluster of two log units 202a, 202b, each having a respective data store 204a, 204b. In some embodiments, for example, a shared log 214 can be partitioned into shards 214a, 214b that are managed by their respective log units 202a, 202b. For example, the shards 214a, 214b can be defined based on even and odd log entries, where even-numbered log entries of the shared log 214 are stored in shard 214a in log unit 202a and odd-numbered log entries are stored in shard 214b in log unit 202b. In some embodiments, the log units 202a, 202b can communicate with each other to pass even-numbered and odd-numbered log entries between each other in order to service read and write requests so that clients 12 can communicate with either log unit 202a, 202b to access the collective shared log 214.

Figure 3:
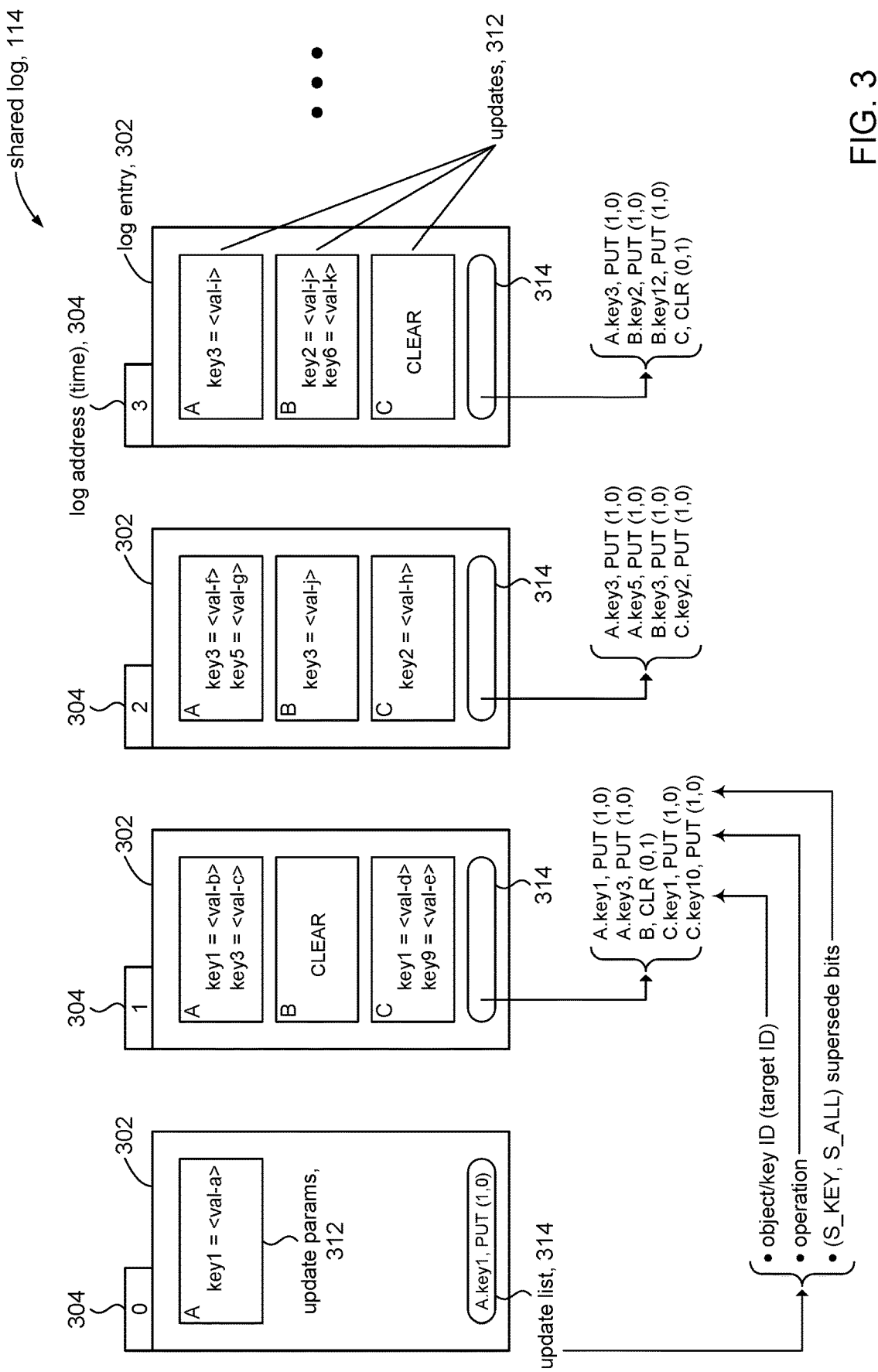
FIG. 3 shows simplified details of a shared log in accordance with some embodiments of the present disclosure.

FIG. 3 shows details of the shared log 114 in accordance with some embodiments of the present disclosure. The shared log 114 comprises a series of log entries 302. Each log entry 302 can be identified (addressed) by a log address 304. Log entries 302 are sequentially appended (one entry at a time) to the tail end of the shared log 114. In some embodiments, log addresses 304 can be represented numerically by monotonically increasing values. As such, the shared log 114 has a temporal quality to it and some of the discussions below may refer to the shared log 114 and its entries 302 in terms of this temporal quality. For example, a log entry 302 having a given log address can be deemed to be newer relative to log entries 302 with lower value log addresses, and vice-versa, a log entry 302 having a given log address can be deemed to be older relative to log entries 302 with higher value log addresses.

Log entries 302 contain, store or otherwise record update parameters 312 relating to one or more operations made on one or more data objects 16. The log entry at address '0', for example, shows one set of update parameters 312 for data object 'A'. The log entry at address '1', shows an example having three sets of update parameters 312 for operations on respective data objects 'A', 'B', and 'C'.

Update parameters 312 can include information about which portions (subsets, elements, fields, etc.) of the associated data object were updated and the operation that was performed. For purposes of explanation, each portion of a data object can be identified or represented by a "key," and the particular data associated with that portion of the data object can be represented as "<val>." For example, log entry '0' represents a PUT operation (e.g., signified by the "=" sign), whereby a portion of data object A identified by key1 is assigned a value <val-a>. Log entry '1' shows that at a later time, key1 in data object A is assigned another value <val-b> in another PUT operation and key3 is assigned <val-c>. Likewise, key1 and key9 in data object C are assigned respective values <val-d> and <val-e>. Log entry '1' also shows an example of another operation CLEAR, which clears the entire data object, in this case data object B. Although the discussion refers to the PUT and CLEAR operations, it will be appreciated that the present disclosure can accommodate other operations.

In accordance with some embodiments of the present disclosure, each log entry 302 can include an update list 314 that includes an identifier (ID) that identifies the target data object of the update, the operation used to perform the update (e.g., PUT, CLEAR), and information bits called "supersede bits." The target ID can use the following naming convention: DataObject.Key, where DataObject identifies the data object and Key identifies the portion in DataObject that is updated. Log entry '0', for example, records an update to one portion (key1) of a single data object (A) and so its update list 314 can have the following information:

A.key1, PUT (1,0)

Likewise, the update list 314 in log entry '2' has separate entries for key3 and key5 in data object A to inform that different portions of that data object were updated. The supersede bits (1,0) in the example above are discussed below.

For operations (e.g., CLEAR) that affect the entire data object, the target ID can simply refer to the data object; see, for example, log entry '1' (data object B) and log entry '3' (data object C). The role of the supersede bits will now be explained.

Some operations have the property of being supersedable. A supersedable operation exhibits the property that when the operation is performed on a given data object, previous instances (occurrences) of that operation on the given data object are no longer necessary to rebuild the object. Consider, the following sequence of an assignment (=) operation:

T1: ObjA.key1=1
T2: ObjA.key1=5
T3: ObjA.key1=2 where the assignment operation is performed on ObjA.key1 three times. The initial assignment at time T1 sets ObjA.key1 to a value of '1'. At time T2, the subsequent operation sets ObjA.key1 to a value of '5'. We see that the assignment operation at time T2 does not depend on the previous state of the data object. The assignment operation at time T1 is no longer relevant subsequent to time T2. The assignment operation at time T1 can be deemed to be superseded by the assignment operation at time T2. Stated differently, the instance or occurrence of the assignment operation at time T2 supersedes the instance of the assignment at time T1. Likewise, the instance of assignment operation at time T3 supersedes earlier instances of the assignment operation, namely operations at time T1 and time T2. The assignment operation can therefore be referred to as a "supersedable-key" operation. The "-key" suffix indicates that the supersedable operation is performed on a portion or subset of the data object, which in some embodiments can be identified by a key.

A supersedable-key operation is supersedable with respect to the portion of the data object that is operated on. Consider, the following sequence of an assignment (=) operation:

T1: ObjA.key1=1
T2: ObjA.key1=5
T3: ObjA.key4=5
T4: ObjA.key1=2

The assignment operation on ObjA.key1 at time T4 supersedes the assignment instances at time T2 and T1, but does not supersede the assignment operation on ObjA.key4 at time T3.

A "supersedable-all" operation, as the "-all" suffix implies, is an operation that operates on the entire data object as compared to a supersedable-key operation. For example, consider the sequence of operations on a data object A comprising data elements identified as key1 and key2:

T1: ObjA.key1=10
T2: ObjA.key2=150
T3: ObjA.key1=20
T4: CLEAR (A)

The CLEAR operation at time T4 operates on the whole data object (e.g., by setting key1 and key2 to '0'). We see that the earlier-in-time instances of the assignment operation at times T1, T2, T3 are no longer relevant after the CLEAR operation is performed at time T4; the CLEAR operation on data object A supersedes all previous supersede-key operations performed on the data object.

In accordance with the present disclosure, the update list 314 includes a supersede bit called S_KEY to indicate whether or not an operation performed on a specific element in a data object is "key" supersedable (bit is set) or not (bit is not set). Likewise, the update list 314 includes another supersede bit called S_ALL to indicate whether or not an operation supersedes all previous operations on the data object (bit is set) or not (bit is not set).

Figure 4:
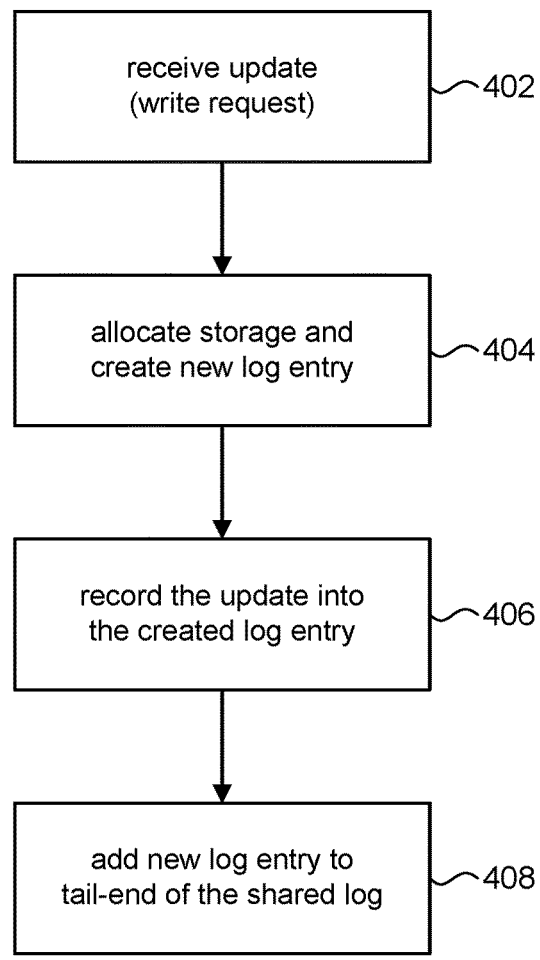
FIG. 4 shows a simplified flow of operations for writing to a shared log in accordance with some embodiments of the present disclosure.

Referring to FIG. 4 and other figures, the discussion will now turn to a high level description of operations and processing in the log unit 102 (e.g., in the shared log frontend 112, FIG. 1) to record a received update into the shared log 114 in accordance with the present disclosure. In some embodiments, for example, the log unit 102 can include computer executable program code, which when executed by a processor (e.g., 712, FIG. 7) in the log unit 102, can cause the log unit 102 to perform processing in accordance with FIG. 4. The operation and processing blocks described below are not necessarily executed in the order shown and can be allocated for execution among one ore more concurrently executing processes and/or threads.

At block 402, the log unit 102 can receive an update from a client. In some embodiments, for example, a client computer (e.g., 12) may issue a write request to the log unit 102 by invoking a method that results in writing the data object. The received update can specify one or more operations and one or more data objects (and/or elements within the data objects) to be operated on by the one or more operations.

At block 404, the log unit 102 can allocate storage to create a new log entry (e.g., 302) to record the received update. Storage for the new log entry can be allocated from a data store (e.g., 104). In some embodiments, for example, log entries can be written to append-only files in a file system on the data store. In a particular implementation, log entries are stored files sized to 100 MB, but in general can be any suitable size.

At block 406, the log unit 102 can record information relating to the received update into the created log entry. For example, parameters that describe the operation(s) and data object(s) specified in the received update can be stored in the update parameters 312 (FIG. 3) portion of the created log entry. Information that identifies each data object (and a portion or subset of that data object) and the corresponding applied operation can be stored in the update list 314 portion of the created log entry, along with setting the appropriate supersede bit (S_KEY, S_ALL), if applicable. In some embodiments, for example, the client can provide in the received update additional parameters that indicate whether the operation is supersedable-all or supersedable-key. In other embodiments, the log unit may be able to make the determination whether the operation is supersedable-all or supersedable-key.

As shown in FIG. 1, in accordance with some embodiments, the log unit 102 can maintain a list (objects list 132) of the data objects that are recorded in the shared log 114. Accordingly, the objects list 132 can be updated to include an identifier(s) of the data object(s) specified in the update in block 402.

Figure 4A:
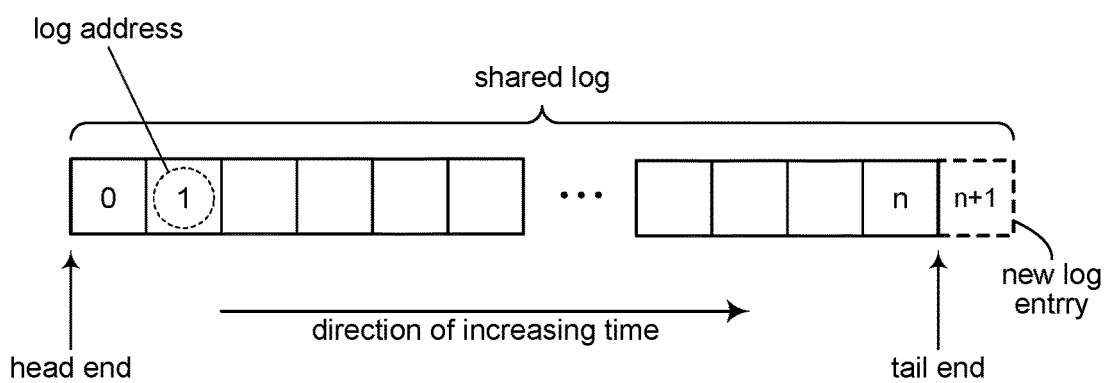
FIG. 4A is a simplified diagram of a shared log used to support the flow of operations shown in FIG. 4.

At block 408, the log unit 102 can add the new log entry to the tail end of the shared log, as shown in FIG. 4A for example, thus advancing the tail end of, and growing, the shared log in the direction of increasing time. As shown in FIG. 4A, each log entry can be assigned or otherwise associated with a numerical identifier (log address, 304) that monotonically increases with each new log entry.

Figure 5:
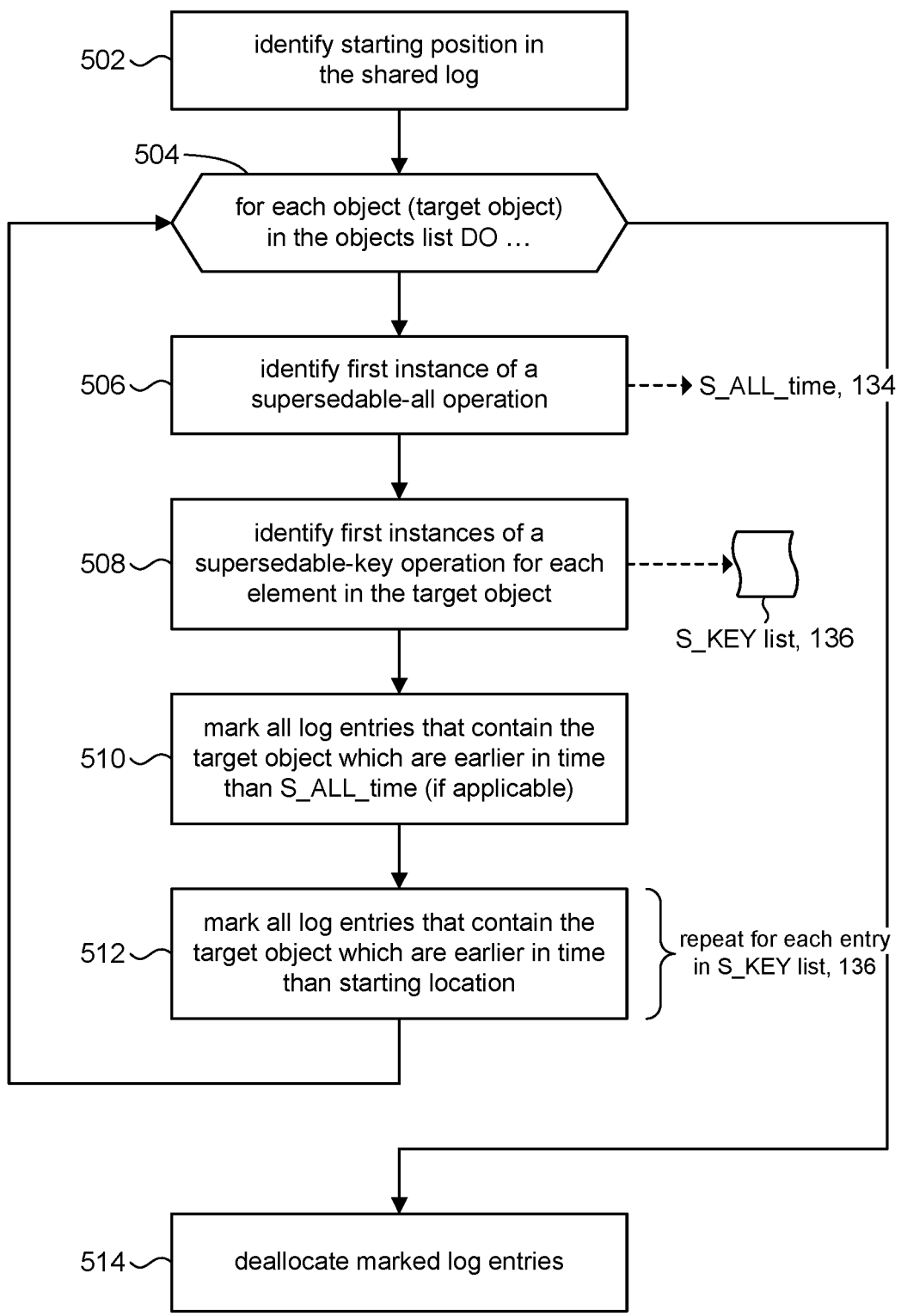
FIG. 5 is simplified flow of operations for in-place garbage collection of a shared log in accordance with some embodiments of the present disclosure.

Referring to FIG. 5 and other figures, the discussion will now turn to a high level description of operations and processing in the log unit 102 (e.g., in the garbage collector 122, FIG. 1) to perform in-place garbage collection on a shared log 114 in accordance with the present disclosure. More particularly, garbage collection in accordance with the present disclosure is performed locally by the log unit 102, rather than by a client 12 or being initiated by the client. In some embodiments, for example, the log unit 102 can include computer executable program code, which when executed by a processor (e.g., 712, FIG. 7) in the log unit 102, can cause the log unit 102 to perform processing in accordance with FIG. 5. The operation and processing blocks described below are not necessarily executed in the order shown and can be allocated for execution among one ore more concurrently executing processes and/or threads.

At block 502, the log unit 102 can identify a starting position in the shared log 114. In some embodiments, for example the starting position can be the tail end (e.g., FIG. 4A) of the shared log 114.

In an iterative loop (blocks 504, 506-512), the log unit 102 can scan the shared log 114 in reverse time order beginning at the starting position (e.g., tail end) of the shared log 114 to mark log entries for deallocation on a per data object basis. For example, as noted above, the objects list 132 contains a list of the data objects that are recorded in the shared log 114. In some embodiments, the loop can be iterated for each data object in the objects list 132 to process one data object at a time. Each iteration of the loop begins with block 506. The data object operated on in a given iteration is referred to in the discussion below as the "target data object."

At block 506, the log unit 102 can scan the shared log 114 to identify the most recent instance or occurrence of a supersedable-all operation (e.g., CLEAR) on the target data object. In some embodiments, for example, a reverse (backward) scan of the shared log 114 can begin from the starting position (e.g., tail end) of the shared log 114 and proceed toward the head end of the shared log 114. At each log entry, the log unit 102 can inspect the update list 314 associated with the log entry to determine whether it contains the target data object and whether the corresponding S_ALL bit (supersedable-all) is set. If the bit is set, the log unit 102 can record the log address of the log entry in a structure called S_ALL_time 134, which represents the most recent occurrence of the supersedable-all operation in the shared log 114. S_ALL_time identifies a starting location in the shared log 114 for the subsequent marking phase of the garbage collection process, explained below.

At block 508, the log unit 102 can perform a similar scan of the shared log 114 to identify the most recent instance of each supersedable-key operation performed on the target data object. In some embodiments, for example, during a reverse scan of the shared log 114, the log unit 102 can inspect the update list 314 in each log entry to identify supersedable-key operations (e.g., PUT) performed on a portion(s) of the target data object. The log unit 102 can record the log address in the data structure S_KEY list 136. In some embodiments, for example, each entry in S_KEY list 136 can include:

object/key ID—this is the portion of the target data object that is being updated
  supersedable-key operation—this is the update operation
  starting location—this is the log address of the log entry; it represents the most recent instance of the supersedable-key operation and identifies the starting location for the marking phase of garbage collection explained below At this point, the log unit 102 has identified the log entries that record the most recent supersedable-all and supersedable-key updates on the target data object. These log entries represent the starting locations for the marking phase of garbage collection, which will now be described. Processing can proceed to blocks 510 and 512 to mark log entries for deallocation that occur earlier in time than the starting locations, in order to reclaim storage in the data store 104. It is noted that if no supersedable-all operations have been identified (e.g., in block 506), then the log unit 102 can skip block 510 and proceed to block 512.

At block 510, the log unit 102 can process a supersedable-all operation on the target data object by marking every log entry in the shared log 114 that is earlier in time than the S_ALL_time associated with that operation. Recall that S_ALL_time represents the most recent occurrence of the supersedable-all operation in the shared log 114. Any log entries earlier in time than S_ALL_time that record a supersedable-key operation (or an earlier instance of the supersedable-all operation) on the target data object can be deemed superseded and can be deallocated. More particularly, only that portion(s) of the log entry that pertain to supersedable-key update on the target data object is marked or otherwise identified for deallocation.

At block 512, the log unit 102 can process entries in the S_KEY list 136, one entry at a time, to mark log entries in the shared log 114 that contain updates on the target data object made by a supersedable-key operation. Recall that each entry in the S_KEY list 136 includes an object/key ID, a supersedable-key operation, and a starting location. The log entry at the starting location records the most recent occurrence of the supersedable update and so earlier log entries that record the supersedable-key operation on the object/key ID are superseded and can be mark for deallocation. Although not shown, a log entry can be marked for deallocation by any suitable manner. In some embodiments, for example one or more bits in the log entry can be used to identify portion(s) of the log entry to be deallocated. In other embodiments, a separate data structure may be defined to identify portion(s) of log entries to be deallocated. In still other embodiments, the marking may include performing the actual deallocation operation as well, and so on.

At this point, log entries associated with the target data object (block 504) have been assessed for deallocation. Processing can return to block 506 for another iteration of the loop (504, 506-512) to process the next data object in the objects list 132, and identify and mark log entries in the shared log 114 for deallocation. After the shared log 114 has been processed for each data object in the objects list 132, the log unit 102 can exit the loop and processing can continue to block 514.

At block 514, the log unit 102 can deallocate the marked log entries. In some instances, the entire log entry may be deallocated. Referring to FIG. 3, for example, consider log entry '0' which contains a single update to A.key1. Since the most recent update to A.key1 occurs at log entry '1', the storage used to represent the update to A.key1 made in log entry '0' can be deallocated; moreover, storage for the entire log entry can be deallocated since the log entry contains only an update to A.key1. In other instances, storage for only portions of a log entry may be marked for deallocation. Referring again to FIG. 3, for example, consider log entry '2'. Storage for only those portions of the log entry that contain information relating to the update of A.key3 and the update of C.key2 would be deallocated because the most recent updates to those objects occur in log entry '3'. However, storage that records the update to B.key3 is not deallocated.

The specific details for deallocating storage depends on details like the particular implementation of the shared log 114, the particular capabilities of the data store 104, and so on. In a specific implementation, for example, each log entry can be a file allocated from a file system on data store 104. The file system can be configured with the capability of punching "holes" in its files. For example, on some Linux systems this can be done by making the system call fallocate( ) with the FALLOC_FL_PUNCH_HOLES flag, which generates a sparse file, freeing up storage in the file system. Accordingly, portions of a log entry file can be deallocated by making calls to fallocate( ) and specifying suitable values for the parameters offset (from the beginning of the file) and len (number of bytes) to carve out those portions of the log entry that need to be deallocated. Referring again to log entry '2' in FIG. 3, for example, assume we want to deallocate storage in the log entry for the updates to A.key3 and C.key2. A call to fallocate( ) with the FALLOC_FL_PUNCH_HOLES flag can specify the offset and len parameters that define a byte range in the file for log entry '2' that contains the data relating to the update of A.key3 in order to deallocate storage pertaining to the update of A.key3. A subsequent similar call to fallocate( ) can be made to deallocate storage pertaining to the update of C.key2. The shared log 114 can be scanned for marked log entries and fallocate( ) can be invoked to delete portions of each marked log entry to reclaim storage in the data store 104.

Garbage collection can be performed as a background process (e.g., a garbage collection daemon) executing on the log unit 102. The marking of log entries and the actual reclaiming of storage (e.g., using the fallocate( ) system call) can occur as separate phases; e.g., an identifying phase, a marking phase, and a deallocation phase. The phases can proceed as separate, concurrent threads, and so on.

Garbage collection can be invoked in any suitable way. In some instance, garbage collection can be triggered by an event; e.g., when available storage in the data store 104 falls below a threshold value, when the shared log reaches a threshold size, and so on. Garbage collection can be triggered periodically; e.g., at particular intervals of time (hourly, weekly, etc.). In some embodiments, a facility can be provided that allows for manually triggering garbage collection; e.g., by a system administrator.

Garbage collection in accordance with embodiments of the present disclosure is performed locally by the log unit itself. The log unit can reclaim storage allocated to the shared log 114 by directly marking and deallocating log entries, in-place, without having to take snapshots or rewriting log entries as is done with checkpointing.

Figure 6:
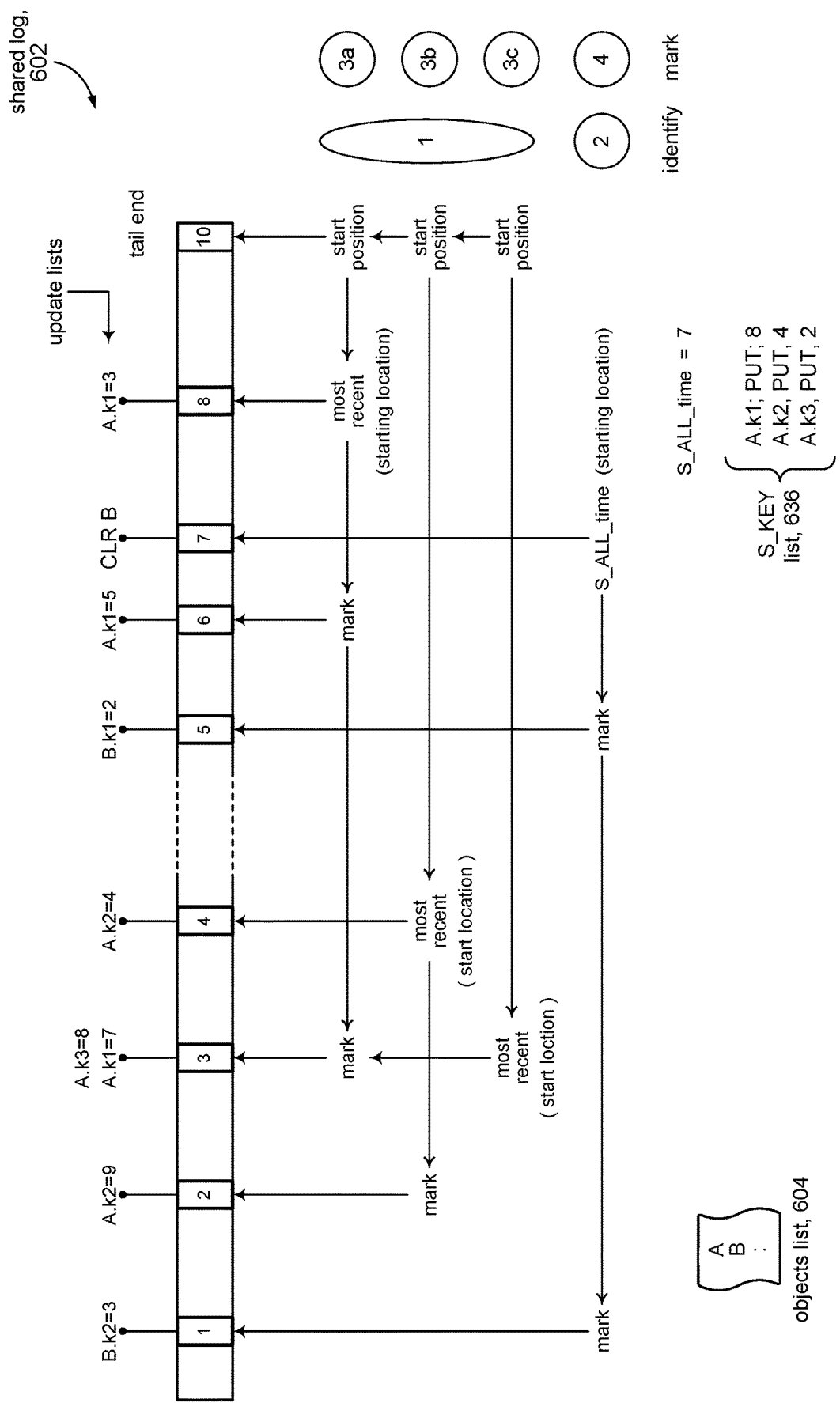
FIG. 6 illustrates an example for garbage collection of a shared log in accordance with some embodiments of the present disclosure.

FIG. 6 shows a highly simplified example of the processing described in FIG. 5, highlighting aspects of in-place garbage collection in accordance with the present disclosure. The figures shows a shared log 602. The discussion will use updates to data objects A and B recorded in the shared log 602 as examples. FIG. 6 shows an objects list 604 includes entries for data objects A and B.

The first entry in the objects list 604 is data object A. In a first iteration 1, the process may identify data object A as the first target data object to be processed (per block 504). A scan of the log entries in the shared log 602 (per block 506) does not reveal any supersedable-all operations on target data object A. A scan of the log entries in the shared log 602 (per block 508) for supersedable-key operations reveals that the most recent updates performed on subsets (portions) of data object A, namely A.k1, A.k2, A.k3, are recorded in respective log entries 8, 4, and 3. The respective starting locations for A.k1, A.k2, A.k3 (for the subsequent marking phase), namely log entries 8, 4, and 3, are written to the S_KEY list 636 (per block 508).

Since there are no supersedable-all operations, processing skips block 510 and proceeds to block 512.

Each subset (A.k1, A.k2, A.k3) of data object A identified in block 508 is processed per block 512. For example, A.k1 may be processed in a first iteration 3a. The most recent log entry in the shared log for the operation on A.k1 is at log entry 8. At iteration 3a, log entries in the shared log that are earlier in time than the identified most recent log entry and which have updates that include earlier instances (occurrences) of the supersedable operation are marked for deallocation. The figure shows that updates to A.k1 made earlier in time than its starting location (log entry 8) occur in log entries 6 and 3, and are therefore marked for deallocation. Likewise, at a second iteration 3b, updates to A.k2 made earlier in time than its starting location (log entry 4) occur at log entry 2, which is marked for deallocation. For iteration 3c, the example shows that an update is recorded for A.k3 only in log entry 3, so there are no earlier-in-time log entries to be marked.

At this point, processing of data object A is complete. The second entry in the objects list 604 is data object B. In a second iteration 2, the process may identify data object B as the first target data object to be processed (per block 504). A scan of the log entries in the shared log 602 (per block 506) reveals a supersedable-all operation on target data object B occurs at log entry 7. The log address is recorded in the S_ALL_time data structure 134 (per block 506). A scan of the log entries in the shared log 602 (per block 508) for supersedable-key operations does not reveal any such operations for target data object B.

In a pass 4, data object B can be processed per block 510. FIG. 6 shows that updates to data object B are recorded in log entries 1, 5, and 7. Since the most recent update (log entry 7) involves a supersedable-all operation (CLEAR), then all earlier-in-time log entries (namely, log entries 5 and 1) that record any updates to data object B are marked for deallocation (per block 510). There are no supersedable-key operations on data object B, so processing per block 508 is skipped.

At this point, all the data objects in the objects list 604 have been processed to identify and mark log entries in the shared log 602 for deallocation, for example, as described above in connection with block 514 of FIG. 5.

FIG. 6 shows that garbage collection in accordance with the present disclosure can be performed in-place, in that log entries are directly assessed and marked for deallocation; there is no need to duplicate data (e.g. snapshot, checkpoint). The in-place processing therefore consumes less storage. Garbage collection is performed locally, thus reducing network traffic if clients were required to perform their own garbage collection processing, and reducing computing load on the clients because they no longer are required perform their own garbage collection processing in the first place.

Figure 7:
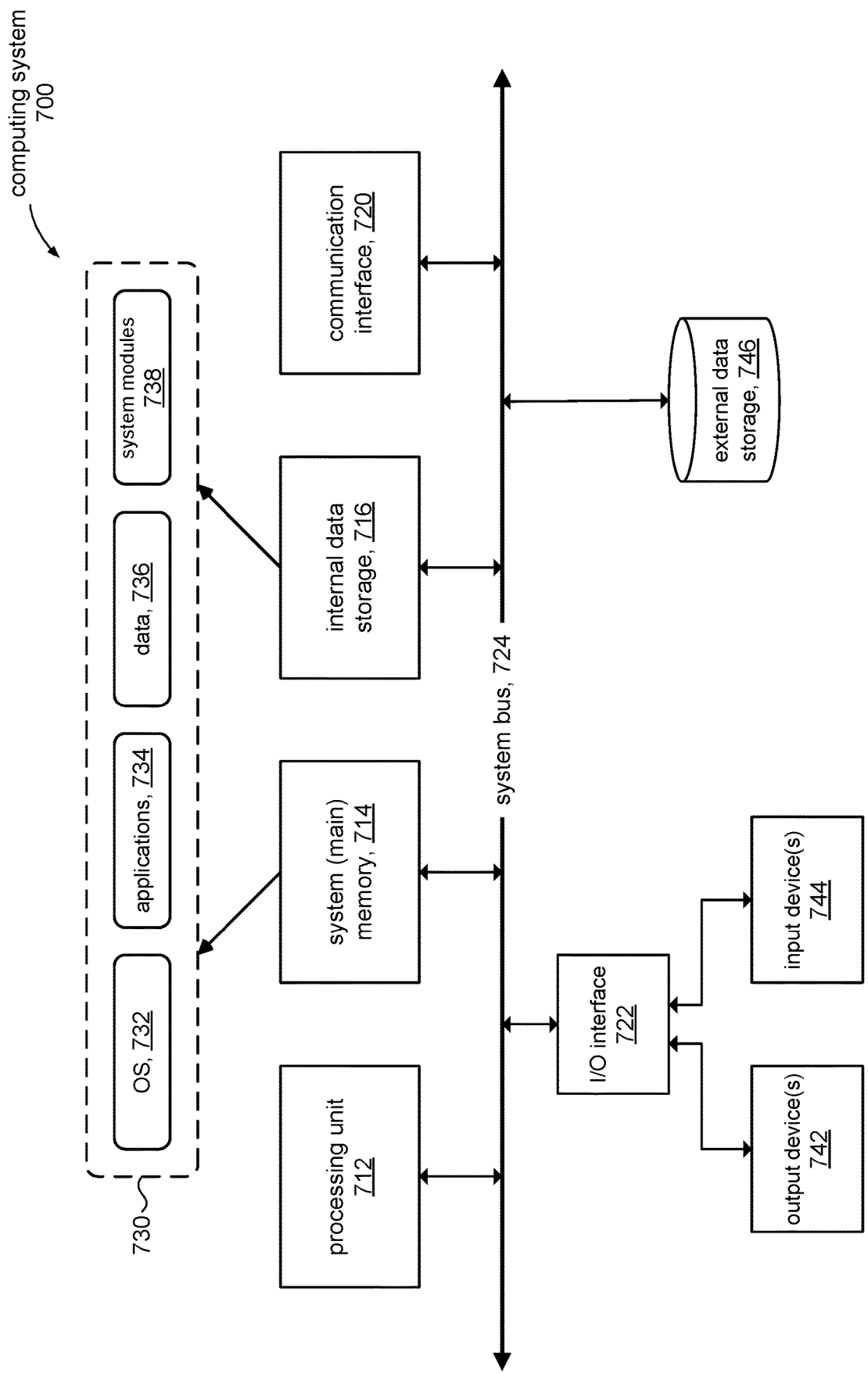
FIG. 7 is a simplified diagram of a computer system component in accordance with some embodiments of the present disclosure.

FIG. 7 is a simplified block diagram of an illustrative computing system 700 for implementing one or more of the embodiments described herein (e.g., log unit 102, FIG. 1). The computing system 700 can perform and/or be a means for performing, either alone or in combination with other elements, operations in accordance with the present disclosure. Computing system 700 can also perform and/or be a means for performing any other steps, methods, or processes described herein.

Computing system 700 can include any single- or multi-processor computing device or system capable of executing computer-readable instructions. Examples of computing system 700 include, for example, servers, distributed computing systems, and the like. In a basic configuration, computing system 700 can include at least one processing unit 712 and a system (main) memory 714.

Processing unit 712 can comprise any type or form of processing unit capable of processing data or interpreting and executing instructions. The processing unit 712 can be a single processor configuration in some embodiments and in other embodiments can be a multi-processor architecture comprising one or more computer processors. In some embodiments, processing unit 712 can receive instructions from program and data modules 730. These instructions can cause processing unit 712 to perform operations in accordance with the various disclosed embodiments (e.g., FIGS. 4, 5, 10-13) of the present disclosure.

System memory 714 (sometimes referred to as main memory) can be any type or form of storage device or storage medium capable of storing data and/or other computer-readable instructions and comprises volatile memory and/or non-volatile memory. Examples of system memory 714 include any suitable byte-addressable memory, for example, random access memory (RAM), read only memory (ROM), flash memory, or any other similar memory architecture. Although not required, in some embodiments computing system 700 can include both a volatile memory unit (e.g., system memory 714) and a non-volatile storage device (e.g., data storage 716, 746).

In some embodiments, computing system 700 can include one or more components or elements in addition to processing unit 712 and system memory 714. For example, as illustrated in FIG. 7, computing system 700 can include internal data storage 716, a communication interface 720, and an I/O interface 722 interconnected via a system bus 724. System bus 724 can include any type or form of infrastructure capable of facilitating communication between one or more components comprising computing system 700.

Internal data storage 716 can comprise non-transitory computer-readable storage media to provide nonvolatile storage of data, data structures, computer-executable instructions and so forth to operate computing system 700 in accordance with the present disclosure. For instance, the internal data storage 716 can store various program and data modules 730, including for example, operating system 732, one or more application programs 734, program data 736, and other program/system modules 738 to provide structures (e.g., objects list, 132) to support and perform various processing and operations disclosed herein.

Communication interface 720 can include any type or form of communication device or adapter capable of facilitating communication between computing system 700 and one or more additional devices. For example, in some embodiments communication interface 720 can facilitate communication between computing system 700 and client computers 12 using a private or public network.

In some embodiments, communication interface 720 can also represent a host adapter configured to facilitate communication between computing system 700 and one or more additional network or storage devices via an external bus or communications channel. Examples of host adapters include, for example, SCSI host adapters, USB host adapters, IEEE 1394 host adapters, SATA and eSATA host adapters, ATA and PATA host adapters, Fibre Channel interface adapters, Ethernet adapters, or the like.

Computing system 700 can also include at least one output device 742 (e.g., a display) coupled to system bus 724 via I/O interface 722, for example, to provide access to an administrator. The output device 742 can include any type or form of device capable of visual and/or audio presentation of information received from I/O interface 722.

Computing system 700 can also include at least one input device 744 coupled to system bus 724 via I/O interface 722, e.g., for administrator access. Input device 744 can include any type or form of input device capable of providing input, either computer or human generated, to computing system 700. Examples of input device 744 include, for example, a keyboard, a pointing device, a speech recognition device, or any other input device.

Computing system 700 can also include external data storage subsystem 746 (e.g., data store 104) coupled to system bus 724. In some embodiments, the external data storage 746 can be accessed via communication interface 720. External data storage 746 can be a storage subsystem comprising a storage area network (SAN), network attached storage (NAS), virtual SAN (VSAN), and the like. External data storage 746 can comprise any type or form of block storage device or medium capable of storing data and/or other computer-readable instructions. For example, external data storage 746 can be a magnetic disk drive (e.g., a so-called hard drive), a solid state drive, a floppy disk drive, a magnetic tape drive, an optical disk drive, a flash drive, or the like.

Figure 8:
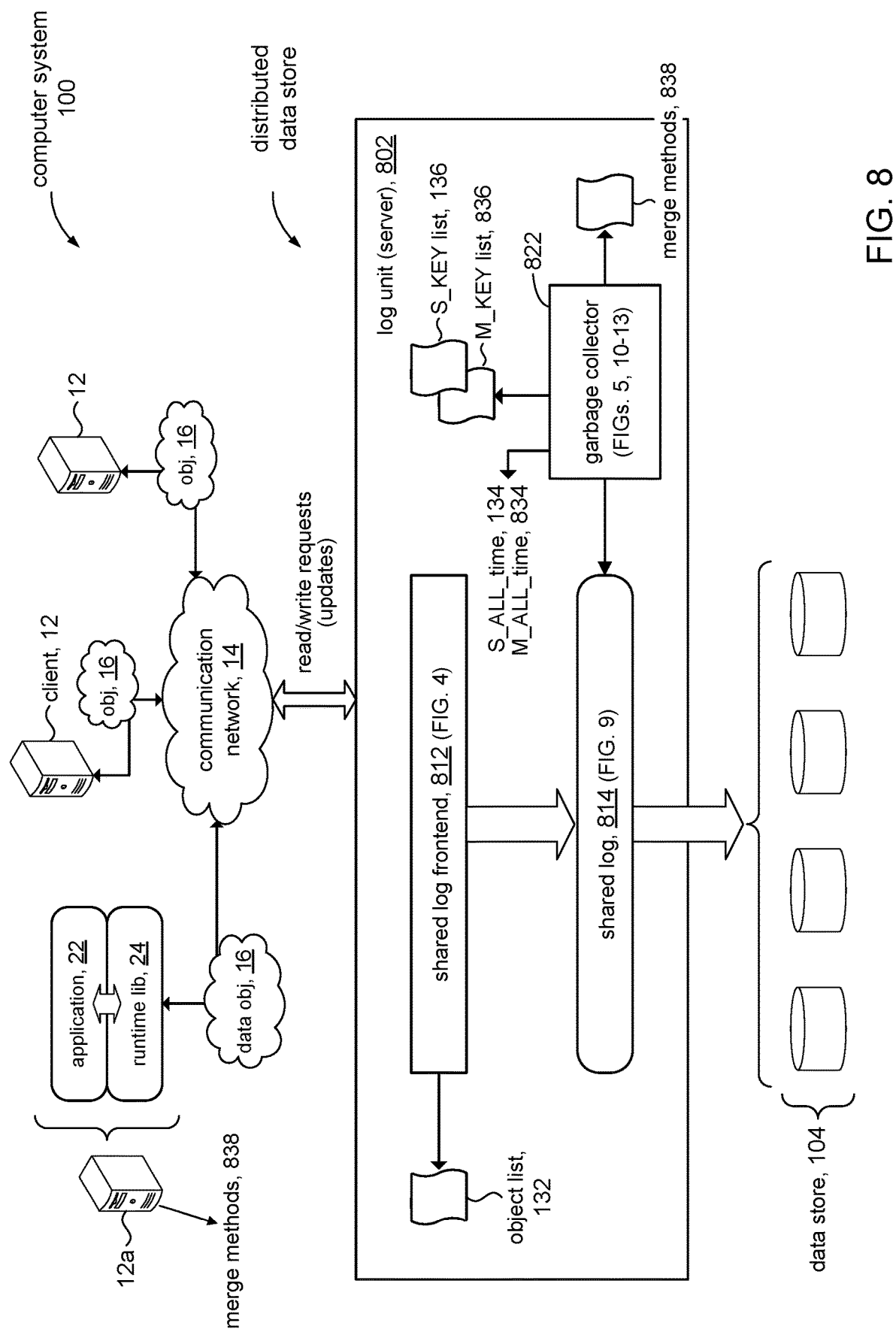
FIG. 8 shows system configured with a shared log in accordance with another aspect of the present disclosure.

FIG. 8 shows the computer system 100 of FIG. 1 configured with a log unit 802 in accordance with another aspect of the present disclosure. The log unit 802 can record changes (write operations) made to the data objects 16 as addressable log entries in a shared log 814. The log unit 802 can include a shared log frontend 812 to receive and process read requests and write requests (updates) made on the shared log 814. In accordance with the present disclosure, the log unit 802 can be configured with a garbage collector 822 to perform its own (local) garbage collection operations to reclaim storage from the shared log 814. In some embodiments in accordance with the present disclosure, the garbage collector 822 can use data structures S_ALL-time 134, M_ALL-time 834, S_KEY list 136, M_KEY list 836, and one or more client-provided merge methods 838 (discussed in more detail below) to facilitate the garbage collection process.

Figure 9:
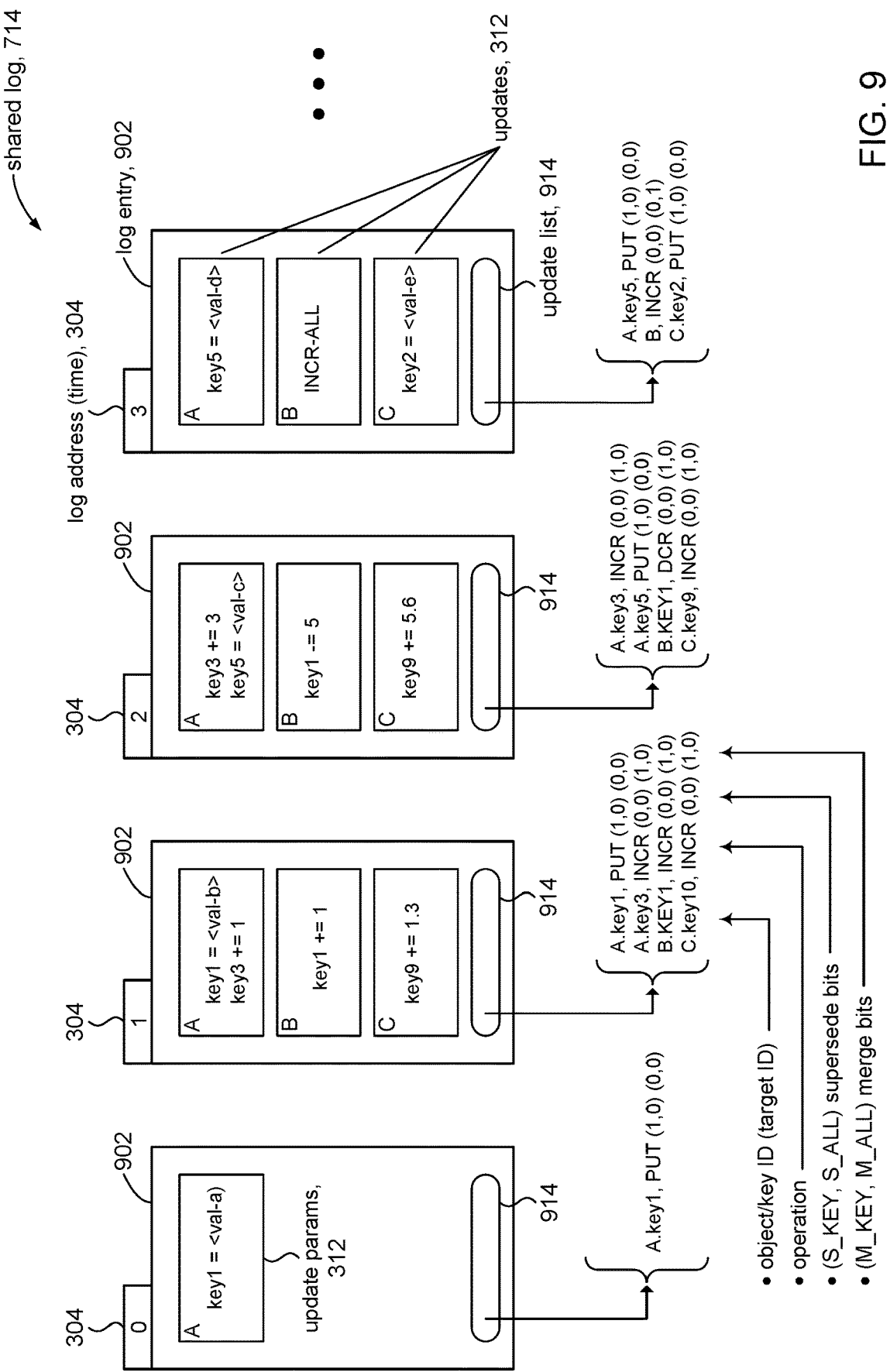
FIG. 9 shows simplified details of a shared log in accordance with another aspect of the present disclosure.

FIG. 9 shows details of the shared log 814 in accordance with some aspects of the present disclosure. In some embodiments, for example, the shared log 814 can be based on the shared log 114 shown in FIG. 3. Elements in the shared log 814 different from the shared log 114 shown in FIG. 3 will now be discussed.

In accordance with some embodiments, for example, the log entries 902 can store additional operations such as INCR (increment), DCR (decrement), and the like. Such operations have the property of being mergeable. A mergeable operation can be combined with another mergeable operation to form a single equivalent and more compact operation that produces the same state as the two separate operations. Consider the following sequence of increment and decrement operations (assume ObjA.key1 is initially equal to '5'):

T1: ObjA.key1+=1
T2: ObjA.key1+=5
T3: ObjA.key1-=2

The initial increment operation at time T1 results in ObjA.key1 equal to '6'. At time T2, ObjA.key1 equals '11' and at time T3 it is equal to '9'. We can see that the three operations can be combined (merged) into a single equivalent operation that produces the same result, for example:

ObjA.key1+=4

The examples shown above are arithmetic operations. It will be appreciated however, that mergeable operations can be non-arithmetic. Database operations, for example, such as INSERT may be deemed mergeable. A VOTE type operation in a leader-election state machine (e.g. the RAFT consensus algorithm) might be deemed mergeable. A client application 12 may define its own mergeable operations, and so on.

A "mergeable-key" operation, like a supersedable-key operation, is a mergeable operation that is performed on a portion of the data object. A "mergeable-all" operation is a mergeable operation that operates on the entire data object rather than just on a subset of the data object. For example, an operation called INCR-ALL may be defined that increments every element in a data object by '1'.

Continuing with the description of FIG. 9, in accordance with some embodiments, the update list 914 in each log entry 902 can include a mergeable bit in addition to the supersedable bits described above in connection with FIG. 3. In some embodiments, for example, the update list 914 can include a mergeable bit called M_KEY to indicate whether or not an operation performed on a specific element in a data object is mergeable (bit is set) on a per key basis or not (bit is not set). Likewise, the update lists 914 can include a mergeable bit called M_ALL to indicate whether or not an operation is mergeable and operates on the entire data object (bit is set) or not (bit is not set).

Referring to FIGS. 8 and 9 in connection with the FIG. 4, processing in the log unit 802 (e.g., in the shared log frontend 812, FIG. 8) to record a received update into the shared log 814 can proceed generally as described above in connection with the flow shown in FIG. 4:

At block 402, the log unit 802 can receive an update from a client 12.

At block 404, the log unit 802 can allocate storage to create a new log entry (e.g., 902) to record the received update.

At block 406, the log unit 802 can record information relating to the received update into the created log entry. In some embodiments, the shared log 814 can be configured to store arbitrarily complex state machines where the data objects and operations on the data objects are defined by the client 12. The log unit 802 can treat such data objects as "opaque" binary blobs. Accordingly, the client 12 can provide information in the update as to whether an operation is mergeable or not. The processing at block 406 can further include setting the appropriate mergeable bits (M_KEY, M_ALL) in the update list 914 of the newly created log entry 814 using information provided in the update. The log unit 802 can maintain a list (objects list 132) of the data objects that are recorded in the shared log 814. Accordingly, the objects list 132 can be updated to include an identifier(s) of the data object(s) specified in the received update.

At block 408, the log unit 802 can add the new log entry to the tail end of the shared log 814.

Figure 10:
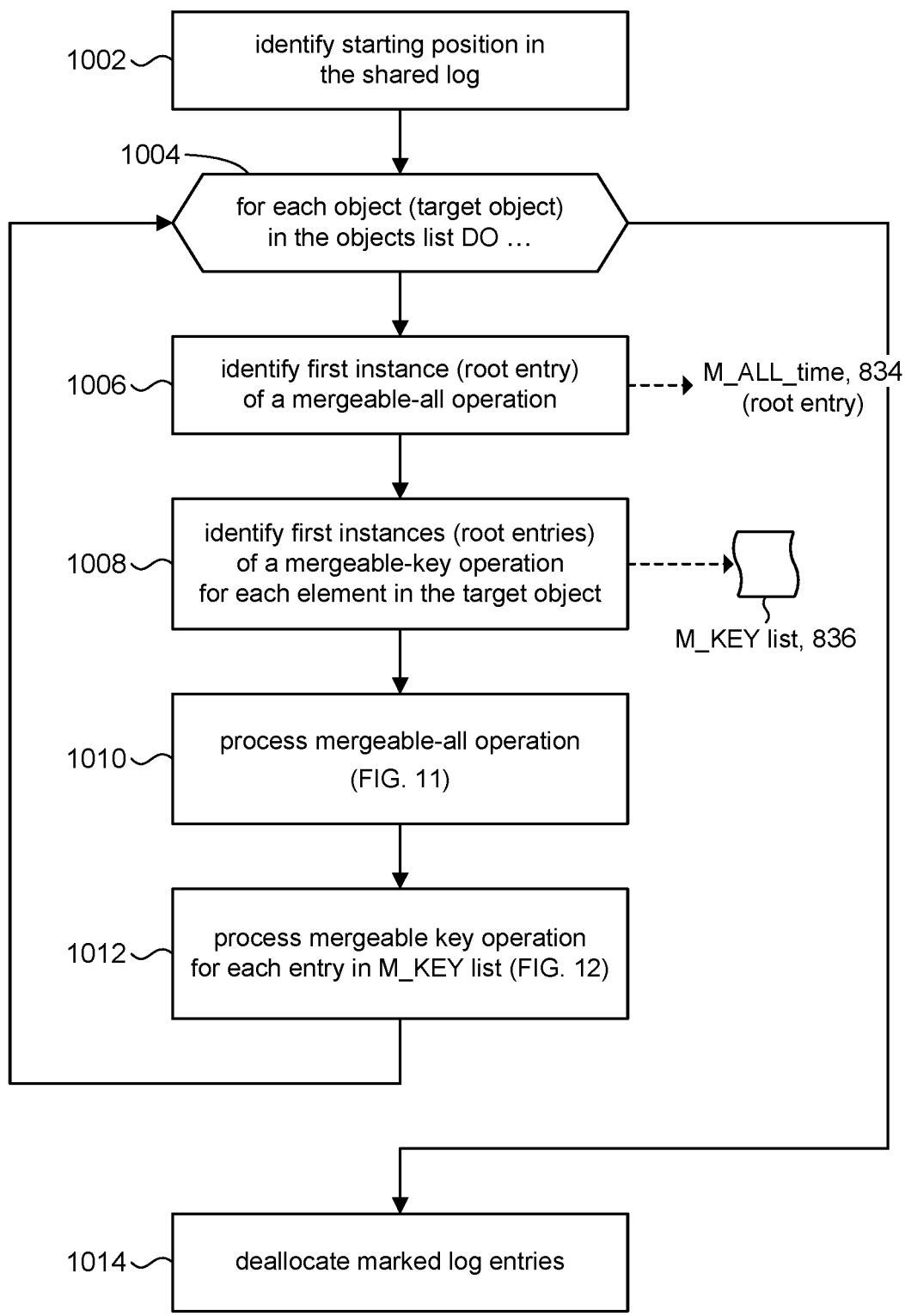

Referring to FIG. 10 and other figures, the discussion will now turn to a high level description of operations and processing in the log unit 802 (e.g., in the garbage collector 822, FIG. 1) to perform garbage collection on the shared log 814 in accordance with the present disclosure, and in particular garbage collection based on mergeable operations. It will be understood that the process outlined in FIG. 5 for garbage collection based on supersedable operations can be combined with the process outlined in FIG. 10 for mergeable operations. In some embodiments, for example, supersedable and mergeable operations can be processed in the same pass through the shared log. In other embodiments, garbage collection can occur in one pass to process supersedable operations and in a separate pass to process mergeable operations.

As noted above, in accordance with the present disclosure, garbage collection is performed locally by the log unit 802, rather than by a client 12. In some embodiments, the log unit 802 can include computer executable program code, which when executed by a processor (e.g., 712, FIG. 7) in the log unit 802, can cause the log unit 802 to perform processing in accordance with FIG. 10. The operation and processing blocks described below are not necessarily executed in the order shown and can be allocated for execution among one ore more concurrently executing processes and/or threads.

At block 1002, the log unit 802 can identify a starting position in the shared log 814. In some embodiments, for example the starting position can be the tail end of the shared log 814.

In an iterative loop (blocks 1004, 1006-1012), the log unit 802 can scan the shared log 814 in reverse time order beginning at the starting position of the shared log 814 to mark log entries for deallocation on a per data object basis. For example, as noted above, the objects list 132 contains a list of the data objects that are recorded in the shared log 814. In some embodiments, the loop can be iterated for each data object in the objects list 132 to process one data object at a time. Each iteration of the loop begins with block 1006. The data object operated on in a given iteration is referred to in the discussion below as the "target data object."

At block 1006, the log unit 802 can scan the shared log 814 to identify the most recent instance or occurrence of a mergeable-all operation on the target data object. In some embodiments, for example, a reverse (backward) scan of the shared log 814 can begin from the starting position of the shared log 814 and proceed toward the head end of the shared log 814. At each log entry (e.g., 902), the log unit 802 can inspect its update list 914 to determine whether it contains the target data object and whether the corresponding M_ALL bit (mergeable-all) is set. If the bit is set, the log unit 802 can record the log address of the log entry (sometimes referred to as the root entry) in the data structure M_ALL_time 834, which represents the most recent occurrence of the mergeable-all operation in the shared log 814. M_ALL_time identifies a starting location (root entry) in the shared log 814 for the subsequent marking phase of the garbage collection process, explained below.

At block 1008, the log unit 802 can perform a similar scan of the shared log 814 to identify the most recent instance of each mergeable-key operation performed on the target data object. In some embodiments, for example, during a reverse scan of the shared log 814, the log unit 802 can inspect the update list 914 in each log entry to identify mergeable-key operations performed on a portion(s) of the target data object. The log unit 802 can record the log address of the log entry that contains the most recent instance of a mergeable key in the date structure M_KEY list 836. In some embodiments, for example, each entry in M_KEY list 836 can include:

- object/key ID—this is the portion of the target data object that is being updated
- mergeable-key operation—this is the mergeable operation
- starting location—this is the log address of the root log entry; it represents the most recent instance of the mergeable-key operation and identifies the starting location for the marking phase of garbage collection explained below At this point, the log unit 802 has identified the root entries in the shared log 814 that record the most recent mergeable-all and mergeable-key updates on the target data object. These log entries represent the starting locations for the marking phase of garbage collection, which will now be described. Processing can proceed to blocks 1010 (described in FIG. 11) and 1012 (described in FIG. 12) to mark log entries for deallocation that occur earlier in time than the starting locations, in order to reclaim storage in the data store 104. It is noted that if no mergeable-all operations have been identified (e.g., in block 1006), then the log unit 802 can skip block 1010 and proceed to block 1012.

After processing in block 1012 has completed, log entries associated with the target data object (block 1004) have been assessed and marked for deallocation. Processing can return to block 1006 for another iteration of the loop (1004, 1006-1012) to process the next data object in the objects list 132, and identify, assess, and mark log entries in the shared log 114 for deallocation. After the shared log 814 has been processed for each data object in the objects list 132, the log unit 802 can exit the loop and processing can continue to block 1014.

At block 1014, the log unit 802 can deallocate the marked log entries. In some embodiments, for example, the deallocation of marked log entries can proceed as described above in connection with the deallocation operation in block 514 in FIG. 5.

Referring to FIG. 11 and other figures, the discussion will now turn to a high level description of operations and processing in block 1010 (FIG. 10) in accordance with the present disclosure to mark log entries in the shared log 814 that record a mergeable-all operation on the given target data object (recalling that one data object at a time is processed). In some embodiments, for example, the log unit 802 can include computer executable program code, which when executed by a processor (e.g., 712, FIG. 7) in the log unit 802, can cause the log unit 802 to perform processing in accordance with FIG. 11. The operation and processing blocks described below are not necessarily executed in the order shown and can be allocated for execution among one ore more concurrently executing processes and/or threads.

At block 1102, the log unit 802 can read the M_ALL_time data structure 834 to identify the root log entry in the shared log 814 that contains the most recent instance of the mergeable-all operation on the target data object.

At block 1104, the log unit 802 can mark log entries in the shared log 814 that are earlier-in-time than the root entry and which record earlier instances of the mergeable-all operation. The marking process is described in FIG. 13. Processing of the mergeable-all operation can be deemed complete at this point.

Referring to FIG. 12 and other figures, the discussion will now turn to a high level description of operations and processing in block 1012 (FIG. 10) in accordance with the present disclosure to scan the M_KEY list 836 to mark log entries in the shared log 814 that record mergeable-key operations on the given target data object. In some embodiments, for example, the log unit 802 can include computer executable program code, which when executed by a processor (e.g., 712, FIG. 7) in the log unit 802, can cause the log unit 802 to perform processing in accordance with FIG. 12. The operation and processing blocks described below are not necessarily executed in the order shown and can be allocated for execution among one ore more concurrently executing processes and/or threads.

Each entry in the M_KEY list 836 is processed one at a time. Recall from above that each entry in the _KEY list 836 contains:
- object/key ID—this is the portion of the target data object that is being updated
- mergeable-key operation—this is the mergeable operation
- starting location—this is the log address of the root log entry; it represents the most recent instance of the mergeable-key operation and identifies the starting location for the marking phase of garbage collection explained below At block 1202, the log unit 802 can identify the root log entry by the starting location of the current entry in the M_KEY list 836. The root entry contains the most recent instance of the mergeable-key operation on the object/key ID.

At block 1204, the log unit 802 can mark log entries in the shared log 814 that are earlier-in-time than the root entry and which record earlier instances of the mergeable-key operation. The marking process is described in FIG. 13. Processing can return to block 1202 to process the next entry in the _KEY list 836.

Referring to FIG. 13 and other figures, the discussion will now turn to a high level description of operations and processing in accordance with the present disclosure to mark log entries in the shared log 814 that record a mergeable operation on the given target data object. This flow is invoked from FIG. 11 and FIG. 12. In some embodiments the log unit 802 can include computer executable program code, which when executed by a processor (e.g., 712, FIG. 7) in the log unit 802, can cause the log unit 802 to perform processing in accordance with FIG. 13. The operation and processing blocks described below are not necessarily executed in the order shown and can be allocated for execution among one or more concurrently executing processes and/or threads.

At block 1302, the log unit 802 can scan the shared log 814 in reverse chronological order starting from the root entry to find a next-most-recent log entry that includes an earlier-in-time instance or occurrence of the mergeable-all (FIG. 11) or mergeable-key (FIG. 12) operation. If none is found, the marking process can be deemed complete and processing can return to FIG. 11 or FIG. 12.

At block 1304, the log unit 802 can invoke a merge function to produce a single equivalent merged operation that represents a combination of the mergeable operation recorded in the root entry and in the next-most-recent entry found in block 1302. As noted above, in some embodiments, the shared log 814 can be configured to store arbitrarily complex state machines where the data objects are defined by the client 12 and therefore can treated as binary blobs. Accordingly, in some embodiments, the client 12 can provide a handle to a merge method 838 (FIG. 8) that the log unit 802 can invoke to combine the mergeable operations. Consider, for example:
    root entry: ObjA.key1+=1
    next-most-recent entry: ObjA.key1+=2
The two operations can be provided as parameters to the client-provided merge method 838, for example:
    merged_op←F client-prog ("ObjA.key1+=1", "ObjA.key1+=2")
to produce a single equivalent merged operation where:
    merged_op="ObjA.key1+=3"
In a specific embodiment, for example, the log unit 802 might invoke the client-provided merge method by providing pointers to the updates recorded in the root entry and in the next-most-recent entry. The client-provided method can return a non-NULL pointer to the merged operation, or the return value can be NULL to indicate that the two operations cannot be merged.

At block 1306, the log unit 802 can record the combined operation in the root entry to replace the previously recorded instance of the mergeable operation. In the above example, the operation "ObjA.key1+=1" in the root entry can be replaced by the"ObjA.key1+=3".

At block 1308, the log unit 802 can mark the next-most-recent log entry that was identified in block 1302 for deallocation. At this point, the root entry has been updated and the next-most-recent log entry has been marked for deallocation. Processing can return to block 1302 to find the "next" next-most-recent log entry in the shared log 814 and continue the process until there are no more earlier-in-time entries, at which point in time all log entries earlier in time than the root entry that record the mergeable operation are marked for subsequent deallocation.

Figure 14D:
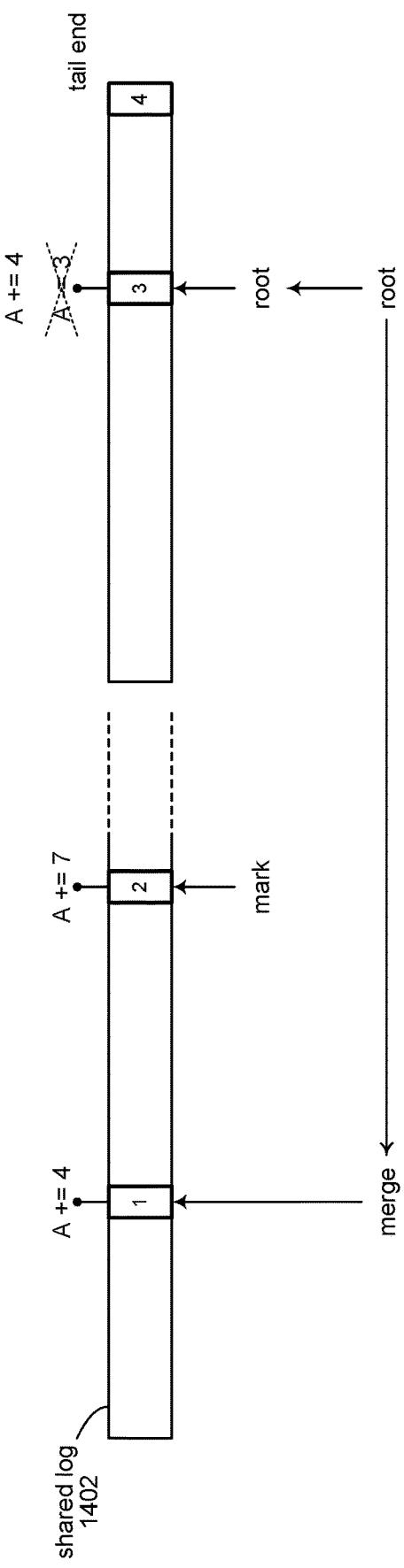
Figure 14E:
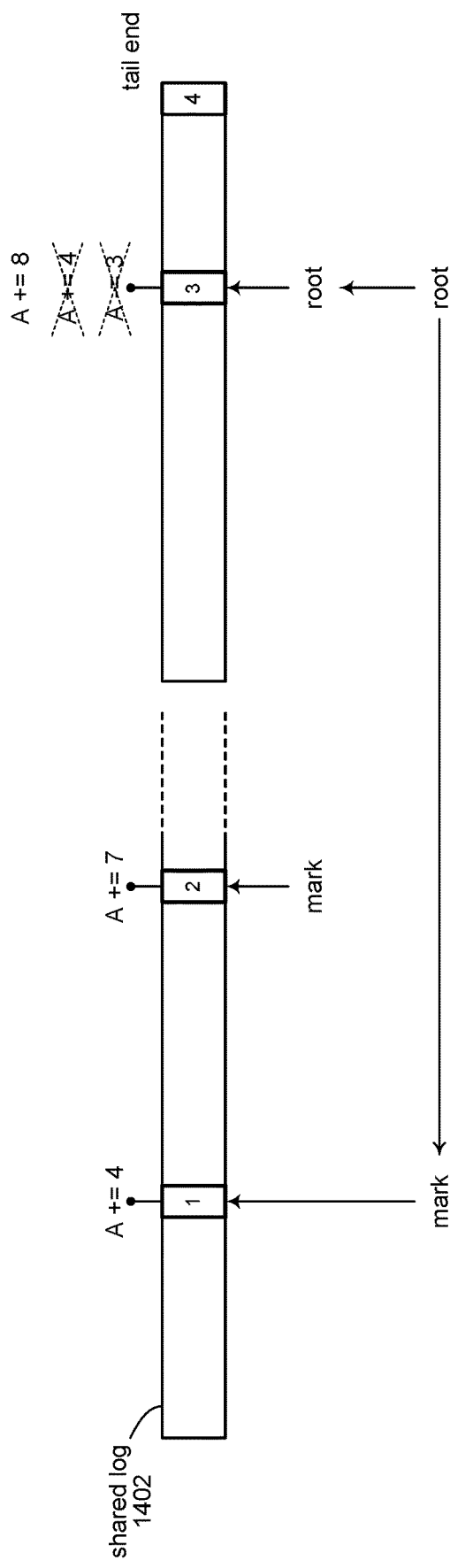

FIGS. 14A-14E show a highly simplified sequence to illustrate an example of in-place garbage collection based on mergeable operations in accordance with the present disclosure. The figures show a shared log 1402 with log entries (addresses) 1-4 highlighted for illustration; log entry 4, for example, is at the tail of the shared log 1402. FIG. 14A shows that the mergeable operation "A−=3" recorded in log entry 3 is the most recent instance (occurrence) of a mergeable operation on a given target data object, and thus can be identified as a root entry. See, for example, blocks 1102 and 1202. FIG. 14B shows the next most recent log entry that records an earlier instance of the operation on the target is at log entry 2 (block 1302). FIG. 14C shows that combining (merging) the operations at log entries 3 and 2 (e.g., using a client-provided merge function) results in the combined operation "A+=4", which is then recorded in the root log to replace the previously recorded operation (blocks 1304, 1306). Log entry 2 can then be marked for deallocation (block 1308). In FIG. 14D, the process continues and log entry 1 is identified as the next next-most-recent log entry to be merged with the root entry. FIG. 14E shows the state of the shared log 1402 after the log entry 1 is merged with the root log. Log entries 1 and 2 are marked for deallocation, and the root entry records a single equivalent operation of the three separate operations. Thus, space allocated in log entries 1 and 2 to record the operations "A+=4" and "A+=7", respectively, can be deallocated since the operations have been merged into the root entry.

FIGS. 14A-14E show that garbage collection in accordance with the present disclosure can be performed in-place, in that log entries are directly assessed and marked for deallocation; there is no need to duplicate data (e.g. snapshot, checkpoint). The in-place processing therefore consumes less storage. Garbage collection is performed locally, thus reducing network traffic if clients were required to perform their own garbage collection processing, and reducing computing load on the clients because they no longer are required perform their own garbage collection processing in the first place.

Conclusion

Garbage collection in accordance with the present disclosure affords benefits over other garbage collection techniques. Checkpointing, for example, is a garbage collection technique for state machine replicated systems. With checkpointing, clients are typically responsible for garbage collection of objects, freeing space by collecting log entries into a large checkpoint, then trimming the log to delete the collected log entries. Client-driven in-memory checkpointing can cause the system to grind to a halt as the system attempts to reclaim memory.

Checkpointing involves producing a consistent snapshot of the system, known as a checkpoint, serializing that data and then writing it to the log. The log entries which were summarized in the checkpoint operation can then be reclaimed, a process known as trimming the log. Checkpointing is problematic because it not only increases write amplification (each checkpoint represents a duplicate of previously written log entries), but the generation of the checkpoint itself requires the client reading an entire object and writing it back. This not only increases network traffic, but also memory consumption at the client performing the checkpoint, which must rebuild a consistent snapshot of the object in the client's memory. Finally, checkpointing temporarily doubles the storage consumption on the log unit: the log unit must be able to persist both the checkpoint and the log entries summarized by the checkpoint until the log entries can be freed.

By comparison, garbage collection in accordance with the present disclosure is performed in-place on the shared log by the log unit, rather than being initiated and managed by the client. This server driven design eliminates garbage collection spikes on clients as well as the write amplification associated with checkpointing by acting directly on the shared log. This avoids the network traffic, write amplification and memory consumption associated with checkpointing. Network traffic is reduced because the client no longer needs to read in the log entries from the shared log to create a checkpoint only write that checkpoint back to the shared log. Write amplification in the shared log (and the I/O penalty associated with it) is significantly reduced because the checkpoint is obviated, as well a memory usage in the client and in the log unit.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a log server comprising:
receiving, by a computer in the log server, updates that specify one or more data objects and one or more operations on the one or more data objects;
recording, by the computer, the received updates in a shared log comprising a plurality of log entries that are allocated from a data store;
performing, by the computer, garbage collection on the shared log, including:
marking log entries in the shared log for deallocation, including:
identifying a most-recent kg entry in the shared log that has recorded therein a first instance of a mergeable operation on a first data object;
identifying a next-most-recent log entry in the shared log that has recorded therein a second instance of the mergeable operation on the first data object;
replacing the first instance of the mergeable operation recorded in the most recent log entry with a single merged operation on the first data object, the single merged operation generated from the first and second instances of the mergeable operation; and
marking the identified next-most-recent log entry for deallocation; and
deallocating at least those portions of marked log entries in the shared log that record instances of the mergeable operation to reclaim storage in the data store for subsequent reallocation.

2. The method of claim 1, further comprising invoking a function with the first and second instances of the mergeable operation to generate the single merged operation on the first data object.

3. The method of claim 2, further comprising receiving a handle to the function from a client computer separate from the log server.

4. The method of claim 1, wherein recording updates in the shared log comprises for each update:
creating a new log entry by allocating storage from the data store;
storing information comprising the update into the new log entry;

storing information into the new log entry that identifies an operation of the update and an indication whether the operation is mergeable; and adding the new log entry to a tail-end of the shared log, wherein updates are stored in subsequently created log entries that are sequentially added to the tail-end of the shared log.

5. The method of claim 1, further comprising de-allocating only those portions of a marked log entry that correspond to a subset of a data object when a mergeable operation recorded in the marked log entry operates on only that subset of the data object.

6. The method of claim 1, further comprising de-allocating only that portion of a marked log entry that corresponds to an entire data object when a mergeable operation in the marked log entry operates on the entire data object.

7. The method of claim 1, further comprising de-allocating a marked log entry in its entirety when the marked log entry stores an update that specifies a single data object and a single merged operation that operates on the single data object.

8. A non-transitory computer-readable storage medium having stored thereon computer executable instructions, which when executed by a computer device, cause the computer device to:

receive updates that specify one or more data objects and one or more operations on the one or more data objects;

record the received updates in a shared log comprising a plurality of log entries that are allocated from a data store;

perform garbage collection on the shared kg, including:
 marking log entries in the shared log for deallocation, including:
  identifying a most-recent kg entry in the shared log that has recorded therein a first instance of a mergeable operation on a first data object;
  identifying a next-most-recent log entry in the shared kg that has recorded therein a second instance of the mergeable operation on the first data object;
  replacing the first instance of the mergeable operation recorded in the most recent log entry with a single merged operation on the first data object, the single merged operation generated from the first and second instances of the mergeable operation; and
  marking the identified next-most-recent log entry for deallocation; and
 deallocating at least those portions of marked log entries in the shared log that record instances of the mergeable operation to reclaim storage in the data store for subsequent reallocation.

9. The non-transitory computer-readable storage medium of claim 8, wherein the computer executable instructions, which when executed by the computer device, further cause the computer device to invoke a function with the first and second instances of the mergeable operation to generate the single merged operation on the first data object.

10. The non-transitory computer-readable storage medium of claim 9, wherein the computer executable instructions, which when executed by the computer device, further cause the computer device to receive a handle to the function from a client computer separate from the computer device.

11. The non-transitory computer-readable storage medium of claim 8, wherein recording updates in the shared log comprises for each update:

creating a new log entry by allocating storage from the data store;

storing information comprising the update into the new log entry;

storing information into the new log entry that identifies an operation of the update and an indication whether the operation is mergeable; and adding the new log entry to a tail-end of the shared log, wherein updates are stored in subsequently created log entries that are sequentially added to the tail-end of the shared log.

12. The non-transitory computer-readable storage medium of claim 8, wherein the computer executable instructions, which when executed by the computer device, further cause the computer device to de-allocate only those portions of a marked log entry that correspond to a subset of a data object when a mergeable operation recorded in the marked log entry operates on only that subset of the data object.

13. The non-transitory computer-readable storage medium of claim 8, wherein the computer executable instructions, which when executed by the computer device, further cause the computer device to de-allocate only that portion of a marked log entry that corresponds to an entire data object when a mergeable operation in the marked log entry operates on the entire data object.

14. The non-transitory computer-readable storage medium of claim 8, wherein the computer executable instructions, which when executed by the computer device, further cause the computer device to de-allocate a marked log entry in its entirety when the marked log entry stores an update that specifies a single data object and a single merged operation that operates on the single data object.

15. An apparatus comprising:
one or more computer processors; and
a non-transitory computer-readable storage medium comprising instructions for controlling the one or more computer processors to:
receive updates that specify one or more data objects and one or more operations on the one or more data objects;
record the received updates in a shared log comprising a plurality of log entries that are allocated from a data store;
perform garbage collection on the shared log, including:
 marking log entries in the shared log for deallocation, including:
  identifying a most-recent log entry in the shared log that has recorded therein a first instance of a mergeable operation on a first data object;
  identifying a next-most-recent log entry in the shared log that has recorded therein a second instance of the mergeable operation on the first data object;
  replacing the first instance of the mergeable operation recorded in the most recent log entry with a single merged operation on the first data object, the single merged operation generated from the first and second instances of the mergeable operation; and
  marking the identified next-most-recent log entry for deallocation; and
 deallocating at least those portions of marked kg entries in the shared log that record instances of the mergeable operation to reclaim storage in the data store for subsequent reallocation.

16. The apparatus of claim 15, wherein the non-transitory computer-readable storage medium further comprises instructions for controlling the one or more computer processors to invoke a function with the first and second instances of the mergeable operation to generate the single merged operation on the first data object.

17. The apparatus of claim 16, wherein the non-transitory computer-readable storage medium further comprises instructions for controlling the one or more computer processors to receive a handle to the function from a client computer separate from the apparatus.

18. The apparatus of claim 15, wherein recording updates in the shared log comprises for each update:
creating a new log entry by allocating storage from the data store;
storing information comprising the update into the new log entry;
storing information into the new log entry that identifies an operation of the update and an indication whether the operation is mergeable; and
adding the new log entry to a tail-end of the shared log, wherein updates are stored in subsequently created log entries that are sequentially added to the tail-end of the shared log.

19. The apparatus of claim 15, wherein the non-transitory computer-readable storage medium further comprises instructions for controlling the one or more computer processors to de-allocate only those portions of a marked log entry that correspond to a subset of a data object when a mergeable operation recorded in the marked log entry operates on only that subset of the data object.

20. The apparatus of claim 15, wherein the non-transitory computer-readable storage medium further comprises instructions for controlling the one or more computer processors to de-allocate only that portion of a marked log entry that corresponds to an entire data object when a mergeable operation in the marked kg entry operates on the entire data object.

* * * * *